US008219438B1

(12) United States Patent
Moon et al.

(10) Patent No.: US 8,219,438 B1
(45) Date of Patent: Jul. 10, 2012

(54) METHOD AND SYSTEM FOR MEASURING SHOPPER RESPONSE TO PRODUCTS BASED ON BEHAVIOR AND FACIAL EXPRESSION

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1015 days.

(21) Appl. No.: 12/215,879

(22) Filed: Jun. 30, 2008

(51) Int. Cl.
*G06Q 10/00* (2012.01)
(52) U.S. Cl. ................ 705/7.29; 705/7.31; 705/7.33
(58) Field of Classification Search .............. 705/7.29, 705/31, 33
See application file for complete search history.

(56) References Cited

U.S. PATENT DOCUMENTS

| | | | | |
|---|---|---|---|---|
| 5,031,228 | A * | 7/1991 | Lu ................................ | 382/227 |
| 5,774,591 | A | 6/1998 | Black et al. | |
| 5,797,046 | A | 8/1998 | Nagano et al. | |
| 5,818,954 | A | 10/1998 | Tomono et al. | |
| 6,008,817 | A * | 12/1999 | Gilmore, Jr. ................. | 345/440 |
| 6,072,496 | A | 6/2000 | Guenter et al. | |
| 6,154,559 | A | 11/2000 | Beardsley | |
| 6,228,038 | B1 * | 5/2001 | Claessens .................... | 600/558 |
| 6,381,346 | B1 * | 4/2002 | Eraslan ........................ | 382/118 |
| 6,443,840 | B2 * | 9/2002 | Von Kohorn ................. | 463/17 |
| 6,577,329 | B1 | 6/2003 | Flickner et al. | |
| 6,659,344 | B2 | 12/2003 | Otto et al. | |
| 6,879,709 | B2 | 4/2005 | Tian et al. | |
| 7,006,982 | B2 | 2/2006 | Sorensen | |
| 7,043,056 | B2 | 5/2006 | Edwards et al. | |
| 7,113,916 | B1 * | 9/2006 | Hill ............................. | 705/7.32 |
| 7,120,880 | B1 * | 10/2006 | Dryer et al. .................. | 715/863 |
| 7,168,618 | B2 | 1/2007 | Schwartz | |
| 7,221,809 | B2 * | 5/2007 | Geng ........................... | 382/280 |
| 7,643,684 | B2 * | 1/2010 | Lee et al. ..................... | 382/190 |
| 2002/0012454 | A1 * | 1/2002 | Liu et al. ..................... | 382/118 |
| 2003/0123754 | A1 * | 7/2003 | Toyama ....................... | 382/291 |
| 2004/0095344 | A1 * | 5/2004 | Dojyun et al. ............... | 345/419 |
| 2005/0180626 | A1 * | 8/2005 | Moon et al. .................. | 382/159 |

(Continued)

OTHER PUBLICATIONS

Bullot, B., Sharma, R and Yeasin, M."From Facial Expression to Level of Interest: A Spatio-Temporal Approach." Proceedings of 2004 IEEE Computer Society Conference , http://ieeexplore.ieee.org/stamp/stamp.jsp?tp=&arnumber=1315264&userType=&tag=1 (Hereinafter "Bullot"), 2004.*

(Continued)

*Primary Examiner* — Peter Choi
*Assistant Examiner* — Renae Feacher

(57) ABSTRACT

The present invention is a method and system for measuring human response to retail elements, based on the shopper's facial expressions and behaviors. From a facial image sequence, the facial geometry—facial pose and facial feature positions—is estimated to facilitate the recognition of facial expressions, gaze, and demographic categories. The recognized facial expression is translated into an affective state of the shopper and the gaze is translated into the target and the level of interest of the shopper. The body image sequence is processed to identify the shopper's interaction with a given retail element—such as a product, a brand, or a category. The dynamic changes of the affective state and the interest toward the retail element measured from facial image sequence is analyzed in the context of the recognized shopper's interaction with the retail element and the demographic categories, to estimate both the shopper's changes in attitude toward the retail element and the end response—such as a purchase decision or a product rating.

42 Claims, 28 Drawing Sheets

U.S. PATENT DOCUMENTS

| | | | | |
|---|---|---|---|---|
| 2006/0104504 | A1* | 5/2006 | Sung | 382/159 |
| 2006/0206371 | A1* | 9/2006 | Hill | 705/10 |
| 2007/0066916 | A1* | 3/2007 | Lemos | 600/558 |
| 2008/0065468 | A1* | 3/2008 | Berg et al. | 705/10 |
| 2008/0068397 | A1* | 3/2008 | Carey et al. | 345/619 |
| 2008/0172261 | A1* | 7/2008 | Albertson et al. | 705/7 |

OTHER PUBLICATIONS

Liu, Ce, Shum, Heung-Yeung and Zhang, Changshui. "Hierarchical Shape Modeling for Automatic Face Localization." ECCV 2002, LNCS 2351, pp. 687-703, 2002, http://people.csail.mit.edu/celiu/pdfs/ECCV_HSM.pdf.*

Ji, Qiang and Li, Xiangyang."Active Affective State Detection and User Assistance with Dynamic Bayesian Networks." IEEE Transactions on Systems, Man, and Cybernetics Part A: System and Humans, vol. 35, No. 1, Jan. 2005.*

Nefian, Ara V. and Hayes, Monson H."Maximum Likelihood Training of the Embedded HMM for Face Detection and Recognition." Center for Signal and Image Processing, Georgia Institute of Technology, IEEE 2000.*

"Facial Expression Recognition System Overview." Nov. 1998.*

Messom, C.H., Sarafzadeh, A. Johnson, M.J. and Chao, F."Affective State Estimation From Facial Images Using Nueral Networks and Fuzzy Logic." Dec. 2003.* van Kuilenburg, Hans, Wiering, Marco and den Uyl, Marten."A Model Based Method for Automatic Facial Expression Recognition." VicarVision, Amsterdam and Urecht Universty, Urecht, Jul. 2005.*

Ji, Qiang."3D Face Pose Estimation and Tracking from a Monocular Camera." Image and Vision Computing 20 (2002) 499-511.*

Leykin, Alex and Tuceryan, Mihran."Tracking and Activity Analysis in Retail Environments." Technical Report 620, Indiana University, IN, Oct. 2005.*

Stiefelhagen, Rainer and Voit, Michael."Tracking Head Pose and Focus of Attention with Multiple Far-filed Cameras," ICMI '06, Nov. 2-4, 2006, Banff, Alberta, Canada.*

"Sociable Machines-Facial Expressions." MIT, Aug. 2006.*

Ge, Zlnliang, Yang, Jle, Zhang, Tianhao, Wang, Huahua and Du, Chunhua."Three-dimensional face pose estimation based on novel nonliner discriminant represenation." Optical Engineering, vol. 45(9), Sep. 2006.Liu, Xiaoming, Krahnstoever, Nil, Yu, Ting and Tu, Peter."What are customers looking at?" Visualization and Computer Vision Lab, Jun. 2007.*

Ekman, Paul and Friesen, Wallace V."Manual for the Facial Action Coding System." Human Interaction Laboratory, University of California, 1978.*

"Facial Expression Recongition System Overview." Nov. 1998.*

Tcherkassof, Anna, Bollon, Thierry, Dubois, Michel, Pansu, Pascal and Adam, Jean-Michel."Facial Expressions of Emotions a methodological contribution to the study of spontaneous and dymanic emotional faces." European Journal of Social Psychology, vol. 37, 1325-1345, 2007.*

Zhan, Yongzhao, Ye, Jingfu, Niu, Dejiao and Cao, Peng."Facial Expression Recognition Based on Gabor Wavelet Transformation and Elastic Templates Matching." International Journal of Image and Graphics, vol. 6, No. 1 (2006) 125-138.*

U.S. Appl. No. 11/685,552, de Lemos.

U.S. Appl. No. 60/877,953, Shama, et al.

U.S. Appl. No. 12/154,002, Moon, et al.

M. S. Bartlett, et al., "Measuring facial expressions by computer image analysis," Psychophysiology, Mar. 1999; 36(2): 253-263.

Y-L. Tian, et al., "Recognizing action units for facial expression analysis," IEEE Transactions on Pattern Analysis and Machine Intelligence, Feb. 2001; 23(2): 97-115.

Y. Zhang, et al., "Active and dynamic information fusion for facial expression understanding from image sequences," IEEE Transactions on Pattern Analysis and Machine Intelligence, May 2005; 27 (5): 699-714.

M. Yeasin, et al., Recognition of facial expressions and measurement of levels of interest from video, IEEE Transactions on Multimedia, Jun. 2006, 8(3): 500-508.

* cited by examiner

METHOD AND SYSTEM FOR MEASURING SHOPPER RESPONSE TO PRODUCTS BASED ON BEHAVIOR AND FACIAL EXPRESSION

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system to provide an automatic measurement of retail customers' responses to retail elements, based on their facial expressions and behaviors.

2. Background of the Invention

The current consumer and market-oriented economy places a great deal of importance on people's opinions or responses to consumer products or, more specifically, various aspects of the products—product display, packaging, labels, and price. A shopper's interest and attitude toward these elements changes dynamically during engagement and interaction with products, and the end response—such as purchase, satisfaction, etc.—is a final summary of such intermediate changes. Most consumer exposure to such visual cues occurs in retail spaces at an immeasurably high number and frequency. The ability to capture such occurrences and effectively measure consumer responses would provide very valuable information to retailers, marketers, and consumer product manufacturers. Though it is nearly impossible to accurately determine a person's mental response without directly asking about it, a person usually reveals some indications of emotional response through information channels such as facial expressions and bodily gestures. It is usually the expression on the face that has high correlation with the emotional response.

There is also a consensus within the market research community that today's consumers make most of their purchase decisions in stores. Therefore, it is extremely important to understand the decision-making process that goes on within a shopper's mind and, at a deeper level, to understand the kind of emotional changes that lead a shopper's ultimate decision. These consumer responses can also be analyzed within the context of demographics, which can be automatically measured based on facial images.

In a typical shopping scenario, a shopper browses through retail aisles with an intention to buy certain products. Then she/he notices a product or a product category that catches her/his attention (regardless of whether it was intended or not), approaches the shelf, interacts with products, and makes a decision as to which one to buy or not to buy at all. Different stages in this shopping process involve different kinds of visual elements and corresponding mental or physical responses. In the 'gross level interest' stage, the shopper takes notice of visual elements that catch her/his attention from a distance—product category, products in promotion, or promotion signs. If the shopper becomes interested, she/he "engages" with the product or category by approaching and stopping at the shelf. Then she/he directly "interacts" with the intended product or further looks for different options within the category or other categories. The interaction involves checking the price, reading the labels, placing the item in the shopping cart, or returning the item to the shelf. The "fine level interest"' of the shopper will reveal which product is currently being considered; typically, picking up the product and/or gaze shows the target of the attention. While these physical cues, such as facing certain direction or looking at certain products, carry much information about the shopper's target of interest and the level of interest, the facial expression of the shopper often reveals a deeper mental response—favor, reservation, disfavor—to the visual elements at each stage, especially during interaction with the products. The response expressed on the face is a very important channel for revealing the internal state. Such information has direct relevance to the success of consumer products or product promotions. On the other hand, the availability of demographic information of each shopper would greatly enrich the analysis, as the shopper response characteristics typically vary with different demographic groups and can provide valuable information for targeted marketing or merchandizing.

The present invention is a method and system to measure the level of shoppers' interest and their mental responses. It utilizes at least one overhead camera to track a shopper's movement and recognize her/his gross-level interest. It also utilizes at least a camera to capture the shopper's face so that the system can measure the gaze and facial expressions.

Recent developments in computer vision and artificial intelligence technology make it possible to detect and track people's behavior from video sequences to further analyze their mental processes—intentions, interests, attractions, opinions, etc. The development in visual tracking technology makes it possible to track shoppers throughout the retail space, and to recognize their engagement and interaction with products. Facial image analysis has been especially matured, so that faces can be detected and tracked from video images, and the motion of the head and facial features can also be estimated. Especially, the head orientation and eye gaze can be measured to estimate the fine-level interest of the shopper. The facial appearance changes due to facial expression can also be measured to estimate the internal emotional state of the person. The estimated facial feature locations help to normalize the facial images, so that machine learning-based demographic classifications can provide accurate demographic information—gender, age, and ethnicity. The proposed invention aims to solve these problems under realistic scenarios where people show natural responses toward visual elements belonging to consumer products—such as product display, product information, packaging, etc. While each instance of such measurement can be erroneous, an accumulated measurement over time will provide reliable information to assess the collective response to a given visual element.

The invention adopts a series of both well-established and novel approaches for facial image processing and analysis to solve these tasks. Body detection and tracking locates shoppers and estimates their movements, so that the system can estimate each shopper's interest to or engagement with products, based on the track of movements. The direction toward which the shopper is facing can also be measured for the same purpose. Face detection and tracking handle the problem of locating faces and establishing correspondences among detected faces that belong to the same person. To be able to accurately locate the facial features, both the two-dimensional (position, size, and orientation) and three-dimensional (yaw and pitch) pose of the face should be estimated. Based on the estimated facial pose, the system normalizes the facial geometry so that facial features—eyes, iris, eyebrows, nose, and mouth—are aligned to standard positions. The estimated positions of irises relative to eyes along with the estimated head orientation reveal the shopper's direction of attention. The invention also introduces a novel approach to extract facial appearance changes due to facial expressions; a collection of image gradient filters are designed that match the shapes of facial features or transient features. A filter that spans the whole size of the feature shape does a more robust job of extracting shapes than do local edge detectors, and will especially help to detect weak and fine contours of the wrinkles (transient features) that may otherwise be missed using traditional methods. The set of filters are applied to the aligned facial images, and the emotion-sensitive features are extracted. These features train a learning machine to find the mapping from the appearance changes to facial muscle actions. In an exemplary embodiment, the 32 Action Units from the well-known Facial Action Coding System (FACS, by Ekman & Friesen) are employed. The recognized facial actions can be translated into six emotion categories: Happiness, Sadness, Surprise, Anger, Disgust, and Fear. These categories are known to reflect more fundamental affective states of the mind: Arousal, Valence, and Stance. The invention assumes that these affective states, if estimated, provide information more directly relevant to the recognition of people's attitudes toward a retail element than do the six emotion categories. For example, the degree of valence directly reveals the positive or negative attitude toward the element. The changes in affective state will then render a trajectory in the three-dimensional affect space. Another novel feature of the invention is to find a mapping from the sequence of affective state to the end response. The central motivation behind this approach is that, while the changes in affective state already contain very useful information regarding the response of the person to the visual stimulus, there can be still another level of mental process to make a final judgment—such as purchase, opinion, rating, etc. These are the kind of consumer feedbacks ultimately of interest to marketers or retailers, and we refer to such process as the "end response." The sequence of affective state along with the shopper's changing level and duration of interest can also be interpreted in the context of the dynamics of the shopper behavior, because the emotional change at each stage of the shopping process conveys meaningful information about the shopper's response to a product. One of the additional novel features of this invention is to model the dynamics of a shopper's attitude toward a product, using a graphical Bayesian framework such as the Hidden Markov Model (HMM) to account for the uncertainties between the state transitions and the correlation between the internal states and the measured shopper responses.

The mapping from the emotional changes to the end response can be estimated by training an HMM using many samples of sequence of affective state and level of interest along with the ground truth end response data. The HMM not only predict the shopper's end response to the product, but also can decode the observed emotional changes to estimate the likely sequence of the shopper's attitude changes toward the product, called intermediate responses.

The present invention also provides the demographic categories of the shopper based on the localized facial images from the face camera of the system. The demographic classifications can be carried out using learning machines trained from a large number of samples. The demographic categories—such as gender, age, and ethnicity—of the shopper provide valuable information so that the estimated shopper response can be analyzed in the context of demographic groups.

There have been prior attempts for automatically estimating the gaze direction or target of a human observer.

In U.S. Pat. No. 5,797,046 of Nagano, et al., the gaze direction is estimated based on the optical signal of the light reflected by the iris, and on the stored personal signature of the reflection. In U.S. Pat. No. 5,818,954 of Tomono, el al., the measured position of the iris relative to the measured facial coordinate is used to estimate the gaze. In U.S. Pat. No. 6,154,559 of Beardsley, the gaze target is recognized based on the measurement of the head pose and the correlation between known visual target and the head pose. In U.S. Pat. No. 6,246,779 of Fukui, el al., the gaze is estimated by comparing the measured facial image feature pattern against the stored facial image feature patterns. In U.S. Pat. No. 7,043,056 of Edwards, et al., the eye gaze direction is estimated by first determining the head pose angle and then locating the iris position relative to the eye region. The present invention employs basic ideas similar to the mentioned inventions; first estimate the head pose, and locate the eye positions. The position of the irises against the localized eyes provides the data to estimate the gaze direction. However, we adopt a series of machine learning-based approaches to accurately and robustly estimate the gaze under realistic imaging conditions; a two-dimensional facial pose estimation followed by a three-dimensional head pose estimation (using the estimated two-dimensional pose), where both estimations utilize multiple learning machines. The facial features are also accurately localized based on the estimated global facial geometry, again using combinations of multiple learning machines, and each take part in localizing a specific facial feature. Each of these machine learning-based estimations of poses or locations utilizes a set of filters specifically designed to extract image features that are relevant to the given estimation. Finally the estimates of the iris location relative to the eye location, combined with the head pose estimate, are used to estimate the gaze direction.

There have been prior attempts for automatically recognizing the visual target and the level of interest by a human observer.

U.S. Pat. No. 7,120,880 of Dryer, et al. proposes a system utilizing a host of measurement modalities, such as facial expression, head gesture, or speech, to assess the level of interest to media contents; it proposes an overall system, without introducing a very specific novel technical means to achieve the recognition of the response or affective information. The present invention introduces novel technology to automatically extract relevant information from the raw image data and recognize the internal (mental/emotional) state of the human. The present invention also uses learning machines such as neural networks, but the learning machines are trained to process feature vectors that are extracted from video images following novel and specific procedures.

There have been prior attempts for automatically recognizing the shopping behavior of retail customers.

In U.S. Pat. No. 6,659,344 of Otto, et al. (hereinafter Otto), the purchase behavior of retail customers and the purchased items (which have RFID tags) are recognized utilizing an RFID scanner attached to a shopping container. In U.S. Pat. No. 7,006,982 of Sorensen (hereinafter Sorensen), a wireless transmitter attached to the shopping cart or carried by the shopper is used to track the shopper's motion throughout the store. In U.S. Pat. No. 7,168,618 of Schwartz (hereinafter Schwartz), an image capture device is used to identify and track the items in the store shelf and in the shopping containers. In the present invention, as in Schwartz, at least one image capture device is strategically placed to capture the shopper's movement and the items in the shelf and the shopping containers, unlike Otto and Sorensen, where wireless transmitters are attached either to the products or the shopper/shopping cart to track the shopping behavior. While Schwartz only introduces an overall method to recognize and track shopping items, the present invention adopts strategic camera positioning and specific image analysis algorithms to track not only the purchased items, but also to track the shoppers, to provide comprehensive shopping behavior data. In U.S. Prov. Pat. Appl. No. 60/877,953 of Sharma, et al. (hereinafter Sharma), a collection of computer vision-based technology is employed to recognize a customer's behavior and engagement with certain product categories in the retail environment. The present invention adopts approaches similar to Sharma to recognize a shopper's interaction with products and identify the group of products with which the shopper engages. In the present invention, a specific technical mean is employed to recognize each of the incidents of engagement, interaction, and purchase. Furthermore, these shopper interactions are measured for the purpose of analyzing the affective state and interest changes of the shopper in the context of these identified behavior segments.

There have been prior attempts for automatically recognizing the facial expression of a person using video images.

In U.S. Pat. No. 5,774,591 of Black, et al., the motions of the facial features due to expression are estimated by computing an explicit parametric model of optical flow. The facial feature motions are translated into mid-level predicates, which in turn are used to determine the expression categories. The proposed invention utilizes emotion-sensitive features that extract feature shape changes implicitly, just to be fed to a learning machine to estimate the facial muscle action. In U.S. Pat. No. 6,072,496 of Guenter, et al., the facial actions are estimated in terms of a very involved three-dimensional mesh model by tracking a set of dedicated marker points. The present invention; strives to estimate the shape change of the facial features just enough to determine the facial muscle action, without using any artificial markers. U.S. Pat. No. 6,879,709 of Tian, et al. (hereinafter Tian-1) only aims to detect emotionless faces, while the present invention tries to estimate the change of expressions in a space representing the whole range of human emotions. In de U.S. Pat. Appl. Pub. No. 20070265507 of de Lemos, mostly eye tracking estimates are used to assess the degree of attention and the location of attention within the visual stimulus. The present invention shares a similar goal of estimating human response in relation to a given visual stimulus, but introduces a different focus on the measurement of whole facial feature shapes to determine the emotional changes to a visual stimulus, with specific technical methods to estimate the facial actions, emotional changes, and finally the response. "Measuring facial expressions by computer image analysis," Psychophysiology, vol. 36, issue 2, by Barlett, et al. (hereinafter Barlett) aims to estimate upper facial Action Units, utilizing the holistic, feature-based, and motion (flow)-based image representation and a neural network-based learning of the representation. "Recognizing Action Units for Facial Expression Analysis," IEEE Transactions on Pattern Analysis and Machine Intelligence, vol. 23, no. 2, by Tian, et al. (hereinafter Tian-2) also estimates parametric models of facial feature shapes, and employs neural networks to learn the mapping to the facial Action Units. The present invention also estimates the facial Action Units in an exemplary embodiment of facial muscle actions, and utilizes a learning machine to find a mapping from the image representation to the muscle actions. However, the present invention utilizes a emotion-sensitive feature extraction scheme, which is different from Barlett or Tian-2. The present invention also utilizes a novel scheme to localize a face and its facial features, while in Barlett the faces are assumed to be aligned. In Zhang "Active and dynamic information fusion for facial expression understanding from image sequences," IEEE Transactions on Pattern Analysis and Machine Intelligence, Vol 27, Issue 5, by Zhang, et al., the dynamic change of facial expressions is recognized by a series of methods starting from IR-based eye detection, and facial feature detection based on the eye detection. The facial Action Unit recognition is based on deterministic correspondence. U.S. patent application Ser. No. 12/154,002 of Moon, et al. (hereinafter Moon) employs a novel combination of face detection, localization, and facial feature localization. The mapping from the facial feature shapes to the facial muscle actions is learned by training on a large number of samples, and the recognized facial muscle actions are translated to affective state. The emotional response is determined from analysis on the constructed sequence of affective state. The present invention adopts similar approaches for facial image processing and emotion recognition. However, one of the novel features of the present invention is to utilize the shopper's target of interest and the shopper behavior measured from body image sequence so that the changes in affective state are segmented and analyzed in the context of shopper interaction. Unlike Moon, the shopper's intermediate responses—the changes in attitude toward the product—are estimated using a graphical Bayesian framework, in addition to the end response to the product.

In summary, the present invention provides fully automatic face localization and facial feature localization approaches, for accurately extracting facial and transient features to estimate facial muscle actions due to emotion changes. For gaze estimation, we adopt a series of machine learning-based approaches to accurately and robustly estimate the gaze under realistic imaging conditions, without using specialized imaging devices and without requiring close-range images. The shopper's interaction with retail elements is identified based on the shopper's trajectory and body orientation, both measured automatically from an image sequence, without using special tracking hardware. The present invention shares the goal of estimating a shopper's response in relation to a given retail product similar to other rating approaches, but it adopts a unique method to determine the end response and intermediate responses using a graphical Bayesian framework.

SUMMARY

The present invention is a method and system for automatically measuring the response of a human to retail elements, by measuring changes in a shopper's affective state and level of interest in the context of a shopper's interaction within a retail environment.

It is one of the objectives of the first step of the processing to detect faces, track them individually, and estimate both the two-dimensional and three-dimensional poses of each of the tracked faces. Given a facial image sequence, the step detects any human faces and keeps individual identities of them by tracking them. Using learning machines trained from facial pose estimation training, the two-dimensional facial pose estimation step computes the (X, Y) shift, size variation, and orientation of the face inside the face detection window to normalize the facial image, as well as to help the three-dimensional pose estimation. The two-dimensional facial pose estimation training requires facial images having varied two-dimensional geometry—(X, Y) shifts, sizes S, and orientations O—that reflect the variations from the face detection step, along with the ground truth values of these variations. Multiple learning machines are trained, where each machine is trained to output high response to facial images having (X, Y, S, O) close to the predetermined (X0, Y0, S0, O0) of the machine. The three-dimensional facial pose estimation computes the yaw (horizontal rotation) and pitch (vertical rotation) in a manner similar to the two-dimensional facial pose estimation.

It is one of the objectives of the second step of the processing to localize facial features and estimate eye gaze. The facial feature localization utilizes facial feature localization machines, where multiple learning machines are trained for each facial feature that is already roughly localized based on the estimated two-dimensional and three-dimensional poses. The eye gaze is estimated based on the deviation of the localized iris positions from the localized eye positions.

It is one of the objectives of the third step of the processing to extract emotion-sensitive features, recognize the facial muscle actions, and estimate the changes in affective state. First, the step derives a set of filters that are matched to facial feature shapes or transient feature (facial wrinkles) shapes, so that the filters can extract the features relevant to facial expressions and, at the same time, ignore other image variations due to lighting, interpersonal variations, etc. Each filter in the emotion-sensitive feature filters is applied to a correspondingly-aligned feature in the image to compute the response. All of the responses are collected in the emotion-sensitive feature vector. It is not straightforward to make a direct connection between the emotion-sensitive filter responses and the facial expressions due to the complex relation between the image responses and the expressions; a large number of such emotion-sensitive feature vectors along with the ground truth expression categories are utilized to learn the relation in a machine learning framework. The trained facial muscle action recognition machine accepts the computed emotion-sensitive feature vector as an input and computes the likelihood of the input face displaying the corresponding muscle actions. The computed facial muscle actions are mapped to the six emotional categories using deterministic relations between the facial muscle actions and the six emotional categories. Then, based on the affect space coordinates of the six emotional categories, the facial muscle actions are mapped into the affect space. The temporal sequence of facial muscle actions due to emotion changes constructs a sequence of affective state in the affect space.

It is one of the objectives of the fourth step of the processing to determine the demographic categories of the face. An accurately localized face is fed to the demographics recognition machines to classify the face into demographic categories, such as gender, age, and ethnicity. Each of the demographics recognition machines is trained using the localized training faces, along with the ground truth demographic labels.

It is one of the objectives of the fifth step of the processing to detect and track humans from the body image sequence, and estimate the orientation of the body. The body detection and tracking can utilize appearance-based learning or motion-based approaches. The direction toward which the person is facing can be estimated based on the trajectory of the person or an appearance-based learning. The estimated body orientation is used to measure the relatively distant target of visual attention (such as a shelf, product category, brand category, etc.).

It is one of the objectives of the sixth step of the processing to recognize the person's shopping behavior, such as engagement with products or product categories, interaction with products, and product purchases. From the positional cue of the shopper provided from the body detection and tracking along with the estimated body orientation, the step detects whether the shopper has approached a shelf space and is ready to interact with products on the shelf space. The step also identifies interaction behaviors with products—picking up a product, reading the price or labels, placing the product to a shopping cart, or returning them to the shelf, based on the foreground object analysis focused on the space between the shopper and the product shelf. The identified products with which the shopper is interacting along with the estimated gaze provide clues to estimate fine-level interest, so that the system can associate the recognized emotional response to a particular product or a product attribute (price, label, etc.). Actual purchase can be detected based on the visual changes detected from the shelf space and the shopping cart.

It is one of the objectives of the seventh step of the processing to estimate the person's intermediate and end responses to the product. After a series of processing to the facial image sequence 633, a sequence of affective state and interest is generated. From the body image sequence, the incidents of engagement, interaction, and purchase are detected and provide timestamps to segment the sequence of affective state and interest. The step then generates segments of affective state and interest. The identified target of interaction also helps to estimate the fine-level interest. The segments of affective state and interest are fed to a response estimation machine, where a Bayesian graphical model, such as the Hidden Markov Model, is employed to estimate both the intermediate responses (the progression of the shopper's attitude changes toward the product) and the end response. The notion of end response includes the likelihood of purchase, a rating for the purchased product, the degree of satisfaction, etc.

DRAWINGS

Figures

DETAILED DESCRIPTION OF THE INVENTION

Figure 1:
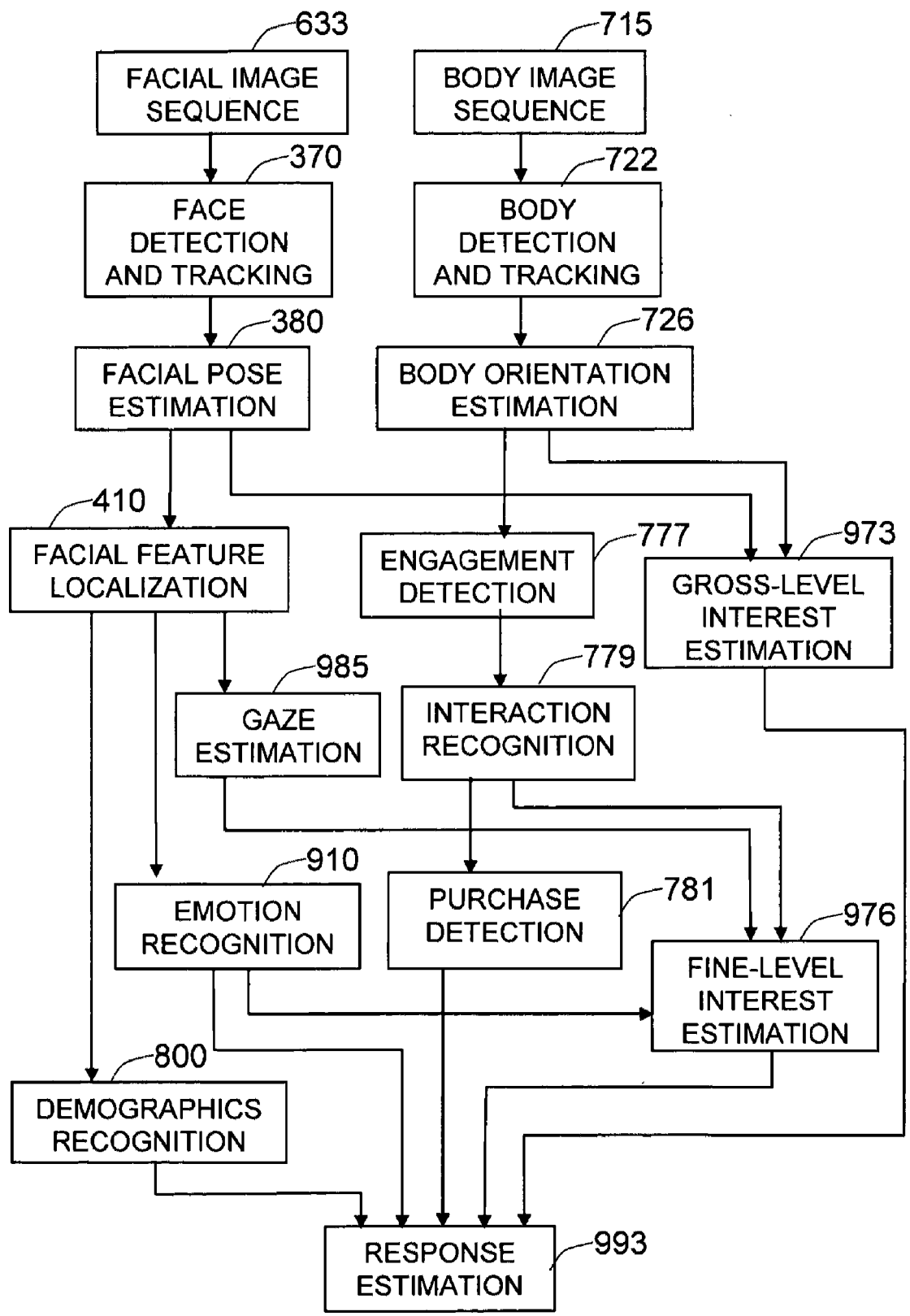
FIG. 1 is an overall scheme of the system in a preferred embodiment of the invention.

FIG. 1 is an overall scheme of the system in a preferred embodiment of the invention. The system accepts two different sources of data for processing: the facial image sequence 633 and the body image sequence 715. Given a facial image sequence 633 that potentially contains human faces, the face detection and tracking 370 step detects any human faces and keeps individual identities of them by tracking them. Using the learning machines trained from facial pose estimation training 820, the facial pose estimation 380 step then computes the (X, Y) shift, size variation, and orientation of the face inside the face detection window to normalize the facial image, as well as the three-dimensional pose (yaw, pitch) of the face. Employing the learning machines trained from the facial feature localization training 830, the facial feature localization 410 step then finds the accurate positions and boundaries of the facial features, such as eyes, eyebrows, nose, mouth, etc. Both the three-dimensional facial pose estimated from the facial pose estimation 380 step and the positions of the iris relative to the eyes are used to estimate the direction toward which the person is currently looking, in the gaze estimation 985 step.

The positions of facial features estimated from the facial feature localization 410 step helps to estimate the facial feature shape changes, so that the facial expressions of the face can be measured to finally recognize the emotional response of the person in the emotion recognition 910 step. The facial images, accurately localized based on the localized features in the facial feature localization 410 step, are fed to the demographics recognition 800 step to classify the face into demographic categories, such as gender, age, and ethnicity.

Given the body image sequence 715, the body detection and tracking 722 step finds any human bodies in the view and individually tracks them. Using an appearance-based method and/or a track-based method, the direction toward which the person is facing is estimated in the body orientation estimation 726 step. The estimated body orientation along with the facial pose estimated in the facial pose estimation 380 step are used to measure the relatively distant target of visual attention (such as a shelf, a product category, a brand category, etc.) in the gross-level interest estimation 973 step. From the positional cue of the shopper provided from the body detection and tracking 722 step along with the estimated body orientation, the system detects whether the shopper has approached a shelf space and is ready to interact with products in the shelf space, in the engagement detection 777 step. Once in the engagement mode, the shopper can quickly check the products and decide to leave the space to look for different products, or can further interact with the products on the shelf space to further check price and label information or make a purchase. The interaction recognition 779 step identifies such interaction behaviors with products—picking up products, reading the prices or label, or returning the products to the shelf. The identified products with which the shopper is interacting along with the estimated gaze from the gaze estimation 985 step provide clues to the fine-level interest estimation 976 step, so that the system can associate the recognized emotional responses to particular products or product attributes (price, label, etc.). Actual purchase can be detected in the purchase detection 781 step, based on the visual changes detected from the shelf space and the shopping cart.

In the response estimation 993 step, the emotional response of the shopper to various retail visual elements (shelves, products, promotions, or posters) at each state of shopping behaviors is recognized by associating the estimated facial expressions or bodily behaviors to the recognized shopping steps. First, the sequence of affective state and interest is segmented based on the detected incidents of engagement, interaction, and purchase; the step generates segments of affective state and interest 908. The segments of affective state and interest 908 are fed to a response estimation machine 997, where a Bayesian graphical model, such as the Hidden Markov Model, is employed to estimate the intermediate responses and the end response. The notion of end response includes the likelihood of purchase, a rating for the purchased product, the degree of satisfaction, etc.

Figure 2:
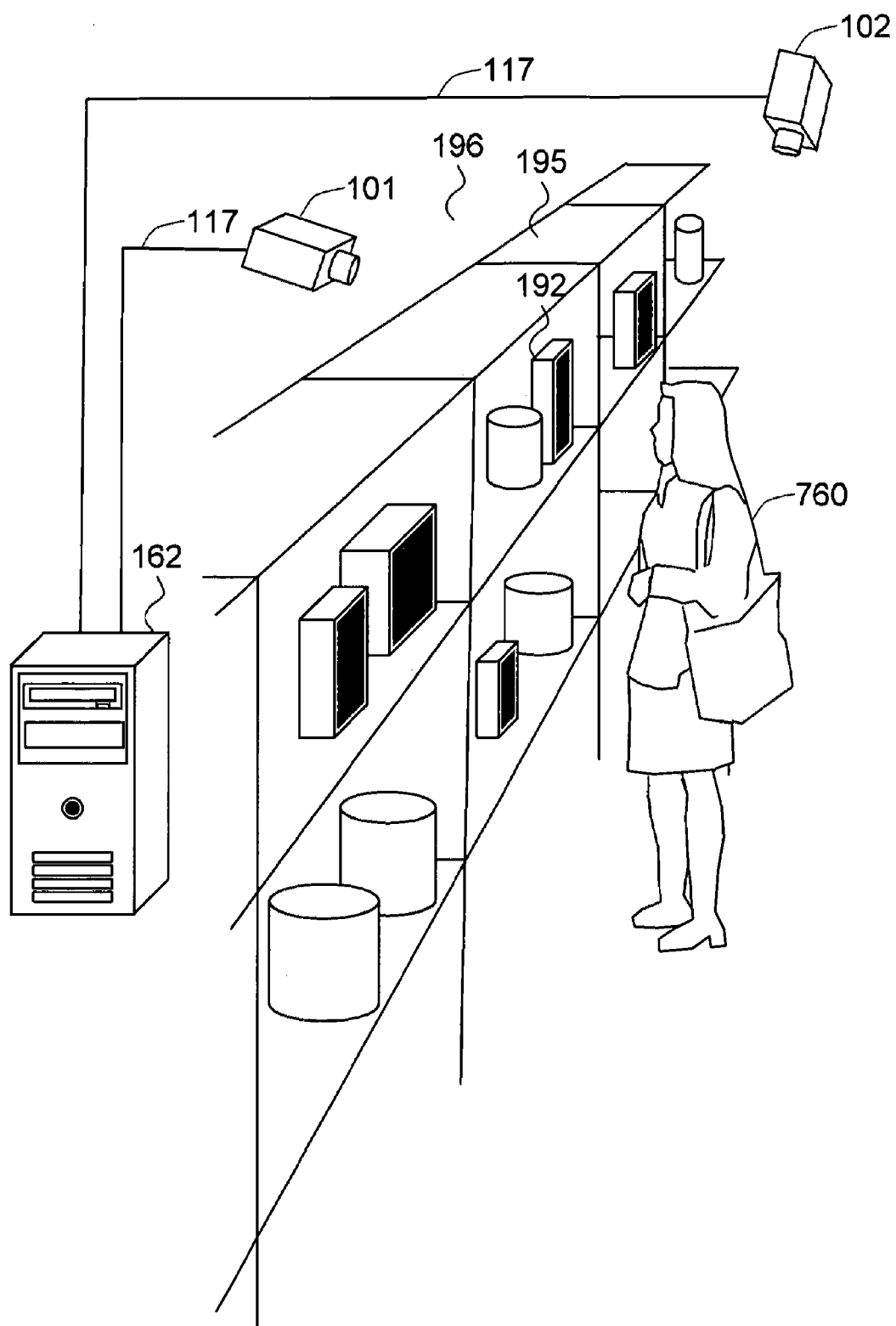
FIG. 2 shows a view of the system of the invention in an operational environment in an exemplary embodiment.

FIG. 2 shows a view of the system of the invention in an operational environment in an exemplary embodiment. The first means for capturing images 101 is placed near the shelf space 196 of a retail store, so that it can capture the face of a customer 760. The second means for capturing images 102 is placed at a different position so as to capture the bodily behavior of the customer 760. The video feeds from both the first means for capturing images 101 and the second means for capturing images 102 are connected to the control and processing system 162 via means for video interface 117 and processed by the control and processing system 162. The video feed from the second means for capturing images 102 is processed to detect meaningful behavior of the shopper 760 within the retail context, such as noticing, approaching, and interacting with products 192, or returning a product to the shelf 195. The video feed from the first means for capturing images 101 is processed by the control and processing system 162 to recognize the response of the customer 760, and the recognized behaviors and the corresponding timestamps are used to segment and interpret the recognized response in a meaningful manner.

Figure 3:
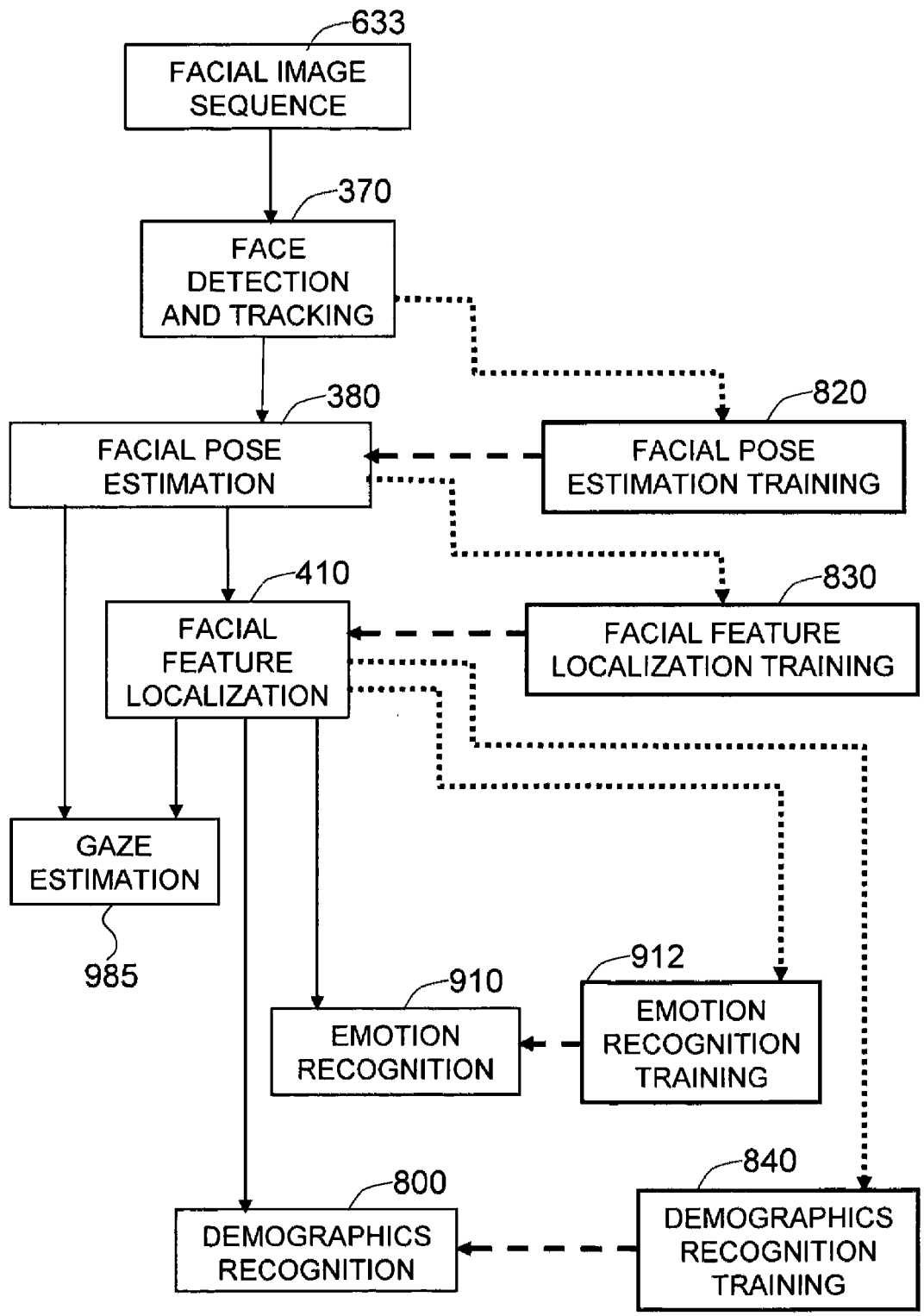
FIG. 3 shows the facial image sequence processing steps, along with the off-line training steps necessary for some of the steps, and a data flow providing appropriate collection of training data to the training steps.

FIG. 3 shows the facial image sequence 633 processing steps, along with off-line training steps necessary for some of the steps, and a data flow providing an appropriate collection of training data to the training steps. The facial pose estimation training 820 step generates learning machines necessary for facial pose estimation 380 by feeding to the machines the kind of facial images that the facial pose estimation 380 would deal with in operation—the facial images detected by the face detection and tracking 370 step. The facial feature localization training 830 also accepts the facial images whose poses are normalized from the facial pose estimation 380 step, as training data. The gaze estimation 985 step utilizes both the facial pose from the facial pose estimation 380 step and the accurate facial feature positions from the facial feature localization 410 step. The emotion recognition training 912 also assumes that the faces (whose facial expressions are to be recognized) have been processed by the facial feature localization 410 step to have accurately estimated facial feature locations. The demographics recognition training 840 step also accepts the facial images whose facial features are accurately localized as training data.

Figure 4:
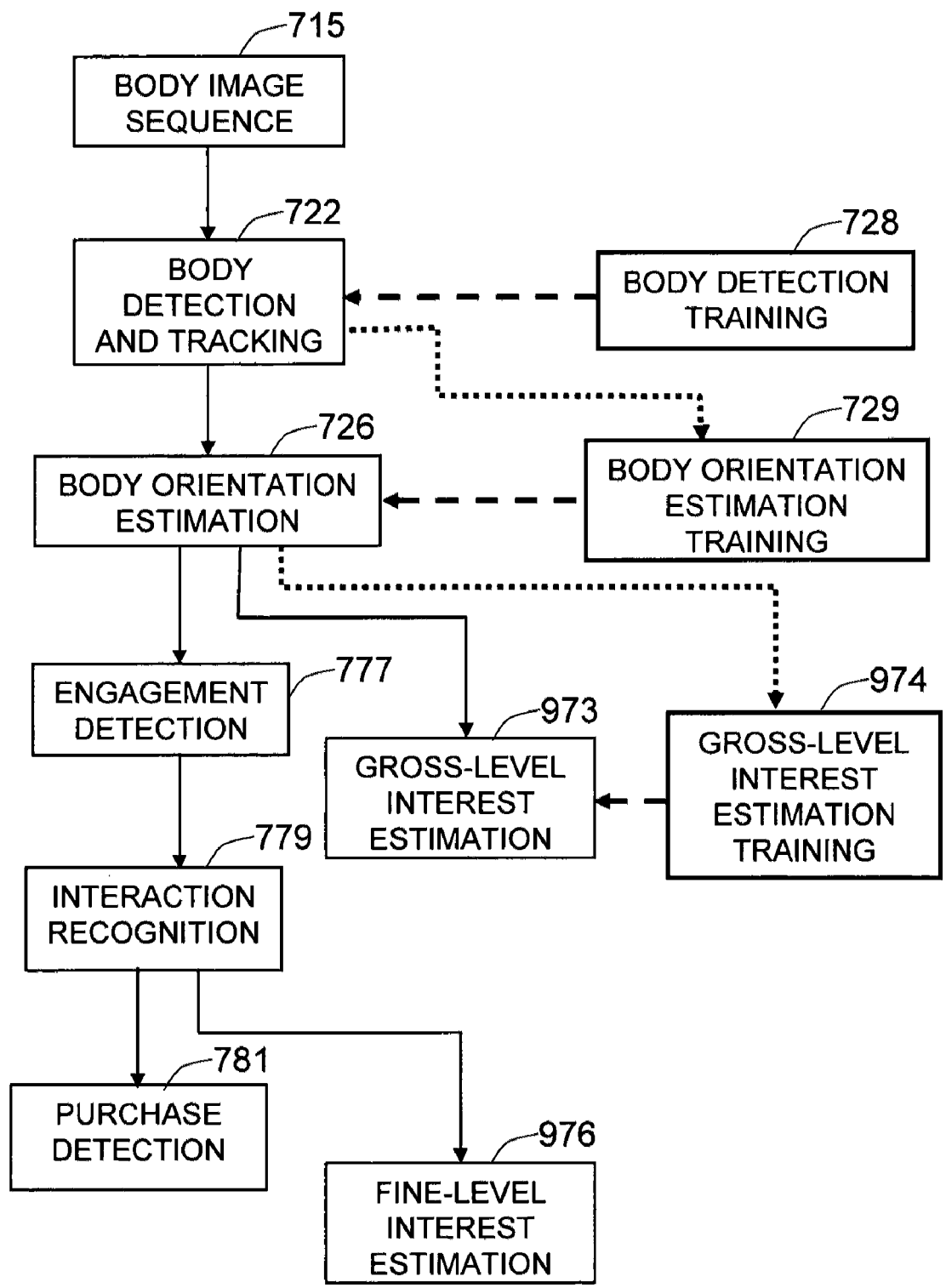
FIG. 4 shows the body image sequence processing steps, along with the off-line training steps necessary for some of the processing steps.

FIG. 4 shows the body image sequence 715 processing steps, along with off-line training steps necessary for some of the processing steps. The body detection training 728 step generates learning machines necessary for the body detection and tracking 722 step. The body orientation estimation training 729 step feeds the body images detected from the previous step along with the annotated orientation of the body to the learning machines, so that the trained machines are used in the body orientation estimation 726 step. The gross-level interest estimation training 974 step utilizes the estimated body orientation data along with the track data from the body detection and tracking 722 step to train learning machines to estimate the gross-level target of visual attention. Engagement detection 777, interaction recognition 779, and purchase detection 781 all make use of the positional and orientational cue of shoppers relative to the products or shelves, provided by the body detection and tracking 722 step and the body orientation estimation 726 step. The interaction recognition 779 step also provides the target of interaction information to the fine-level interest estimation 976 step.

Figure 5:
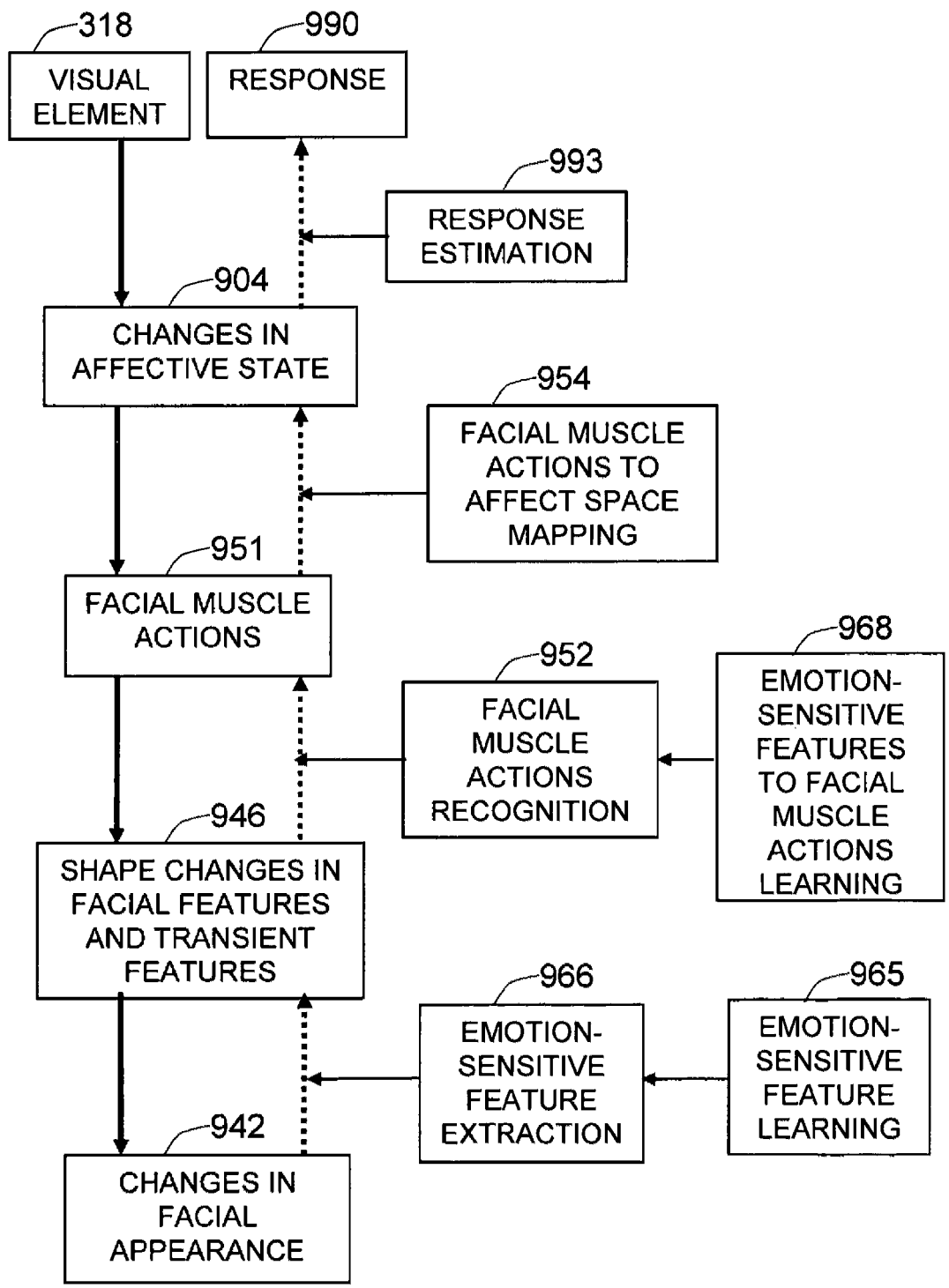
FIG. 5 shows a model of the forward chain of actions from the visual stimulus to the facial expressions of the human watching the visual stimulus.

FIG. 5 shows a model of the forward chain of actions from the visual stimulus to the facial expressions of a human watching the visual stimulus. This model serves as a basis for the methods of the present invention, which are the reverse chain of estimations, to determine the end response from the facial manifestation of the emotional changes. The stepwise procedure has been laid out: the procedure of how the visual element 990 affects the internal mental and physical states of the person to manifest the changes in facial appearance 942 at the end, and the necessary procedures to estimate the response 986 reversely from the changes in facial appearance 942. First, the visual element 990 triggers the changes in affective state 904 of the person. The central nervous system then transmits the signal to facial muscles so that the contraction of the muscles generates the specific facial muscle actions 951. The facial muscle actions 951 render the shape changes in facial features and transient features 946, which then manifest the changes in facial appearance 942. The proposed method aims to solve the reverse problem by employing an appropriate measure for each of these processes. First the set of emotion-sensitive filters 963, which was determined from the emotion-sensitive feature learning 965 step, estimates the shape changes in facial features and transient features 946 in the emotion-sensitive feature extraction 966 step. From the estimated shape changes in facial features and transient features 946, the facial muscle actions recognition 952 step (learned from the emotion-sensitive features to facial muscle actions learning 968 steps) identifies the facial muscle actions 951 that triggered the shape changes. The series of recognized facial muscle actions 951 is then mapped to the changes in emotional state 904, which is represented by a sequence of affective state 910 using a deterministic facial muscle actions to affect space mapping 954. The response estimation 993 step can process a sequence of affective state to estimate the response 990.

Figure 6:
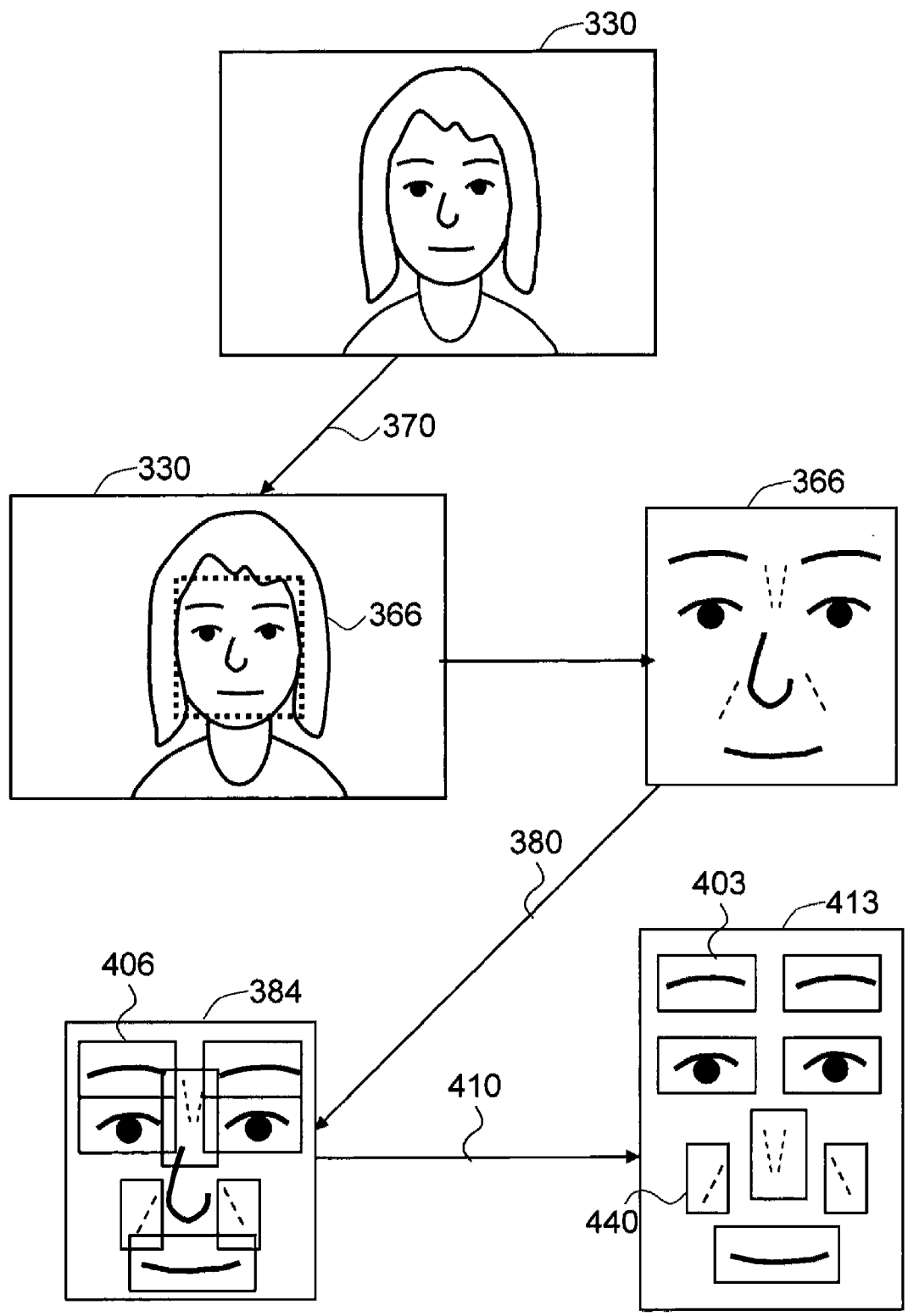
FIG. 6 shows a series of facial image processing steps, from the face detection and tracking step to the facial pose estimation step, and then to the facial feature localization step.

FIG. 6 shows a series of facial image processing steps, from face detection and tracking 370 to facial pose estimation 380, and then to facial feature localization 410. Any image-based face detection algorithm can be used to detect human faces from an input image frame 330. Typically, a machine learning-based face detection algorithm is employed. The face detection algorithm produces a face window 366 that corresponds to the locations and the sizes of the detected face. The facial pose estimation 380 step estimates the two-dimensional and three-dimensional pose of the face to normalize the face to a localized facial image 384, where each facial feature is localized within a standard facial feature window 406. The facial feature localization 410 step then finds the accurate locations of each facial feature or transient feature to extract them in a facial feature window 403 or a transient feature window 440.

Figure 7:
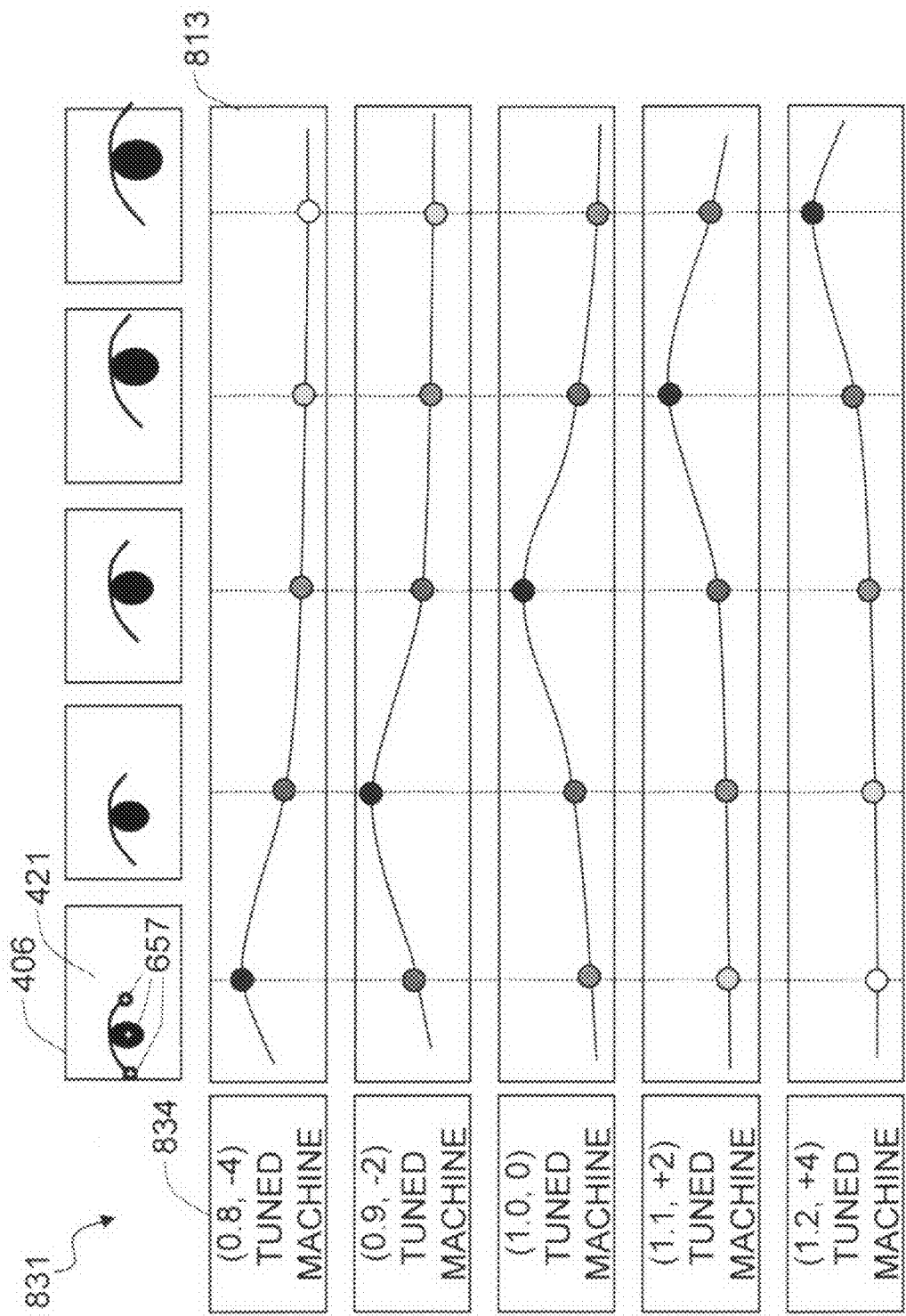
FIG. 7 shows a facial feature localization training scheme in an exemplary embodiment of the present invention.

FIG. 7 shows a facial feature localization training scheme 831 in an exemplary embodiment of the present invention. The facial pose estimation training 820 can be performed on facial images 631 in a similar manner to the facial feature localization training.

This exemplary training scheme aims to estimate the x (horizontal) shift, y (vertical) shift, the scale, and the orientation of the right eye within the standard facial feature window 406.

The training eye images are generated by cropping the standard facial feature window 406 of the right eye from the localized face. The facial landmark points of the face are assumed to be known, and the coordinates of the landmark points 657, after going through the facial pose estimation 380 step, are available.

Given an input right eye image 421, the machine having the inherent geometry of (x0, y0, s0, O0) is trained to output the likelihood of the eye image 421 having the inherent geometry. If the input training eye has the (ex, ey, es, eo), then the target output is the Gaussian likelihood: $L=\mathrm{Exp}(-(ex-x0)/kx-(ey-y0)/ky-(es-s0)/ks-(eo-o0)/ko)$. kx, ky, ks, and ko are constants determined empirically. (ex, ey, es, eo) can be easily determined beforehand using the coordinates of the landmark points relative to the standard facial feature positions and sizes.

Each plot in FIG. 7 illustrates the responses 813 profile that each machine is trained to learn. Each machine is trained to produce a peak for the eye image 421 having the matching geometry, and to produce gradually lower values as the geometry changes from the inherent geometry of the machine. In this exemplary embodiment, multiple learning machines are employed to estimate the x-location and the scale of the right eye, where each machine is tuned to a specific (x-shift, scale) pair; the figure is illustrated only for the two dimensions (x, s)=(x-shift, scale) for the purpose of clear presentation.

Figure 8:
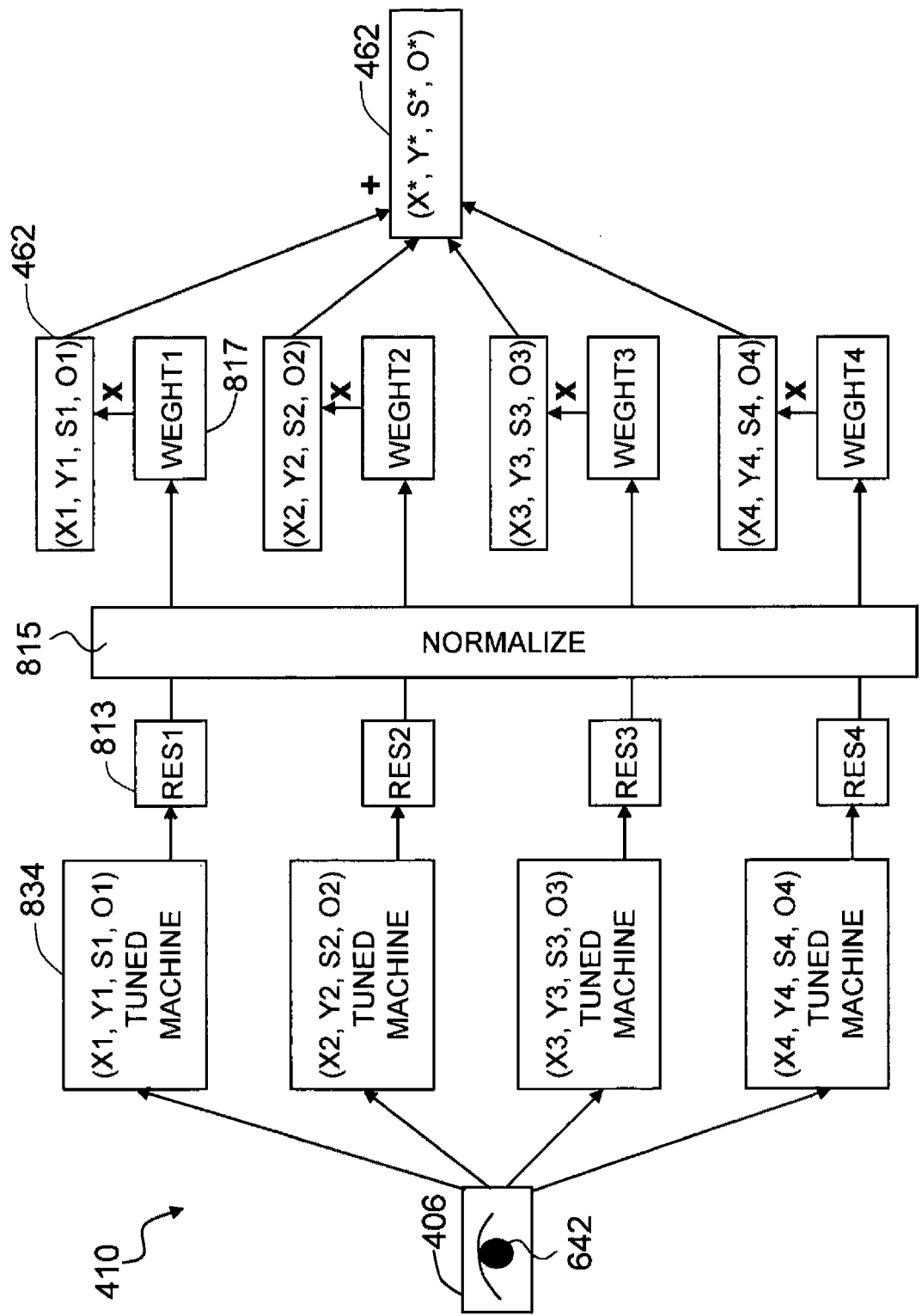
FIG. 8 shows the facial feature localization scheme in an exemplary embodiment of the present invention.

FIG. 8 shows the facial feature localization 410 scheme in an exemplary embodiment of the present invention. The facial pose estimation 380 step can be performed on a facial image 630, in a similar manner to the facial feature localization.

Once each facial feature tuned machine 834 has been trained to output the likelihood of the given facial feature to have the predetermined pose vector (xi, yi, si, oi), an array of such learning machines can process any facial feature image 642 to compute the likelihoods.

A given facial feature image 642 inside the standard facial feature window 406 is fed to the trained learning machines, and then each machine outputs the responses 813 to the particular pose vector 462 (xi, yi, si, oi). The responses are then normalized 815 by dividing them by the sum of the responses to generate the weights 817. The weight is then multiplied to the corresponding pose vector (xi, yi, si, oi). The pose vectors (x1, y1, s1, o1), (xN,yN,sN,oN) are weighted and added up to compute the estimated pose vector (x*, y*, s*, o*). The pose vector represents the difference in position, scale, and orientation that the given facial feature image has against the standard feature positions and sizes. The pose vector is used to correctly extract the facial features and the transient features.

Figure 9:
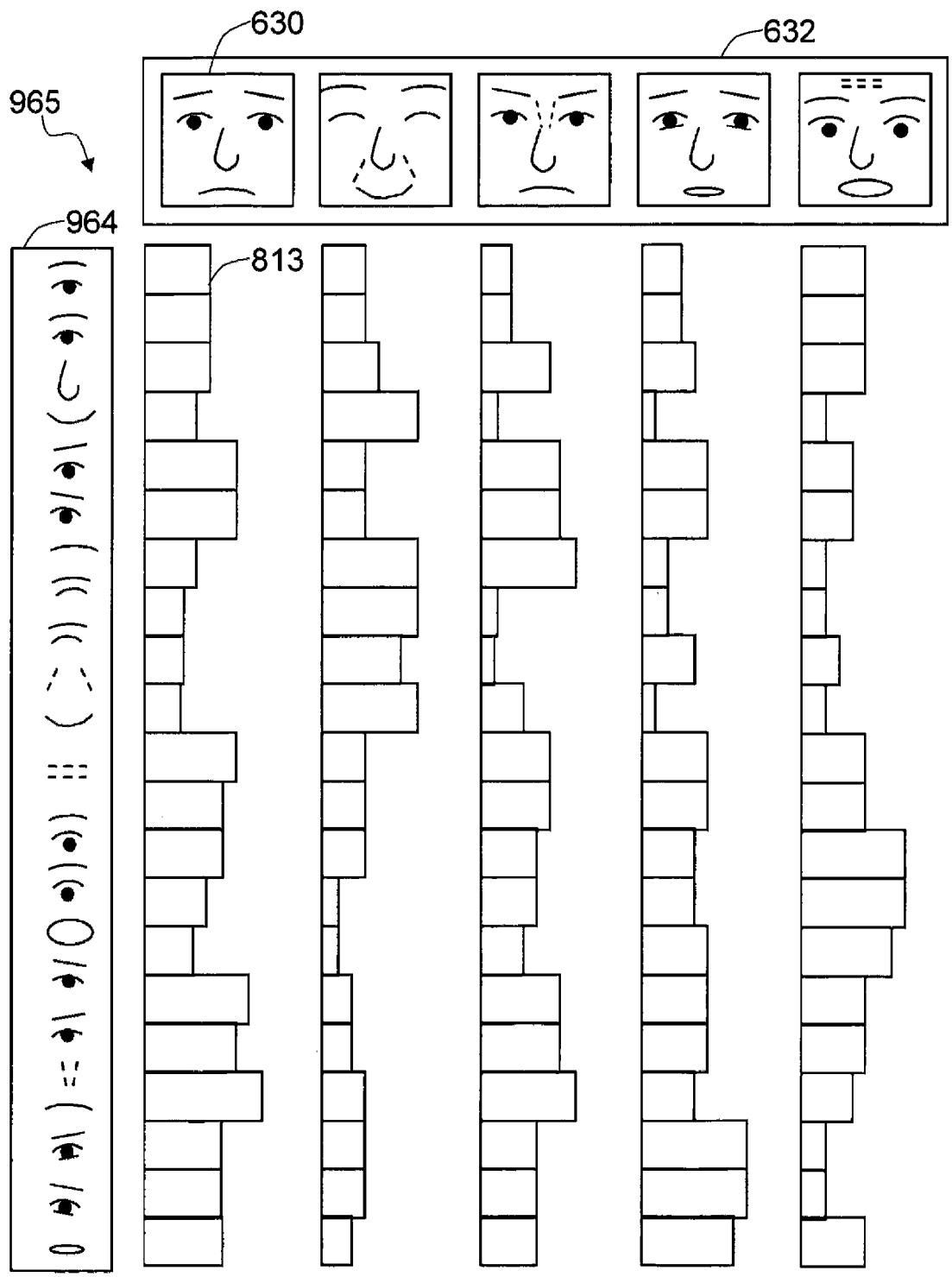
FIG. 9 shows an exemplary embodiment of the emotion-sensitive feature learning.

FIG. 9 shows an exemplary embodiment of the emotion-sensitive feature learning 965. The step aims to derive a set of filters that are matched to facial feature shapes or transient feature (facial wrinkles) shapes, so that the filters can extract the features relevant to facial expressions and, at the same time, can ignore other image variations due to lighting, etc. First a large number of emotion-sensitive feature candidate filters 964 are generated that are designed to extract edge responses of the facial features or transient features; the positions and shapes of the filters match the corresponding positions and shapes of the features. Then the filters are applied to a facial image database 632 of many different people, showing a variety of facial expressions. Each facial image 630 goes through the facial pose estimation 380 step and facial feature localization 410 step, so that the locations and sizes of the filters match the estimated locations and sizes of the facial features of the facial image 630. After the filter responses 813 are collected, the subset of the candidate filters that gave rise to sufficient response to some proportion of facial images are chosen as the emotion-sensitive feature filters 963.

Figure 10:
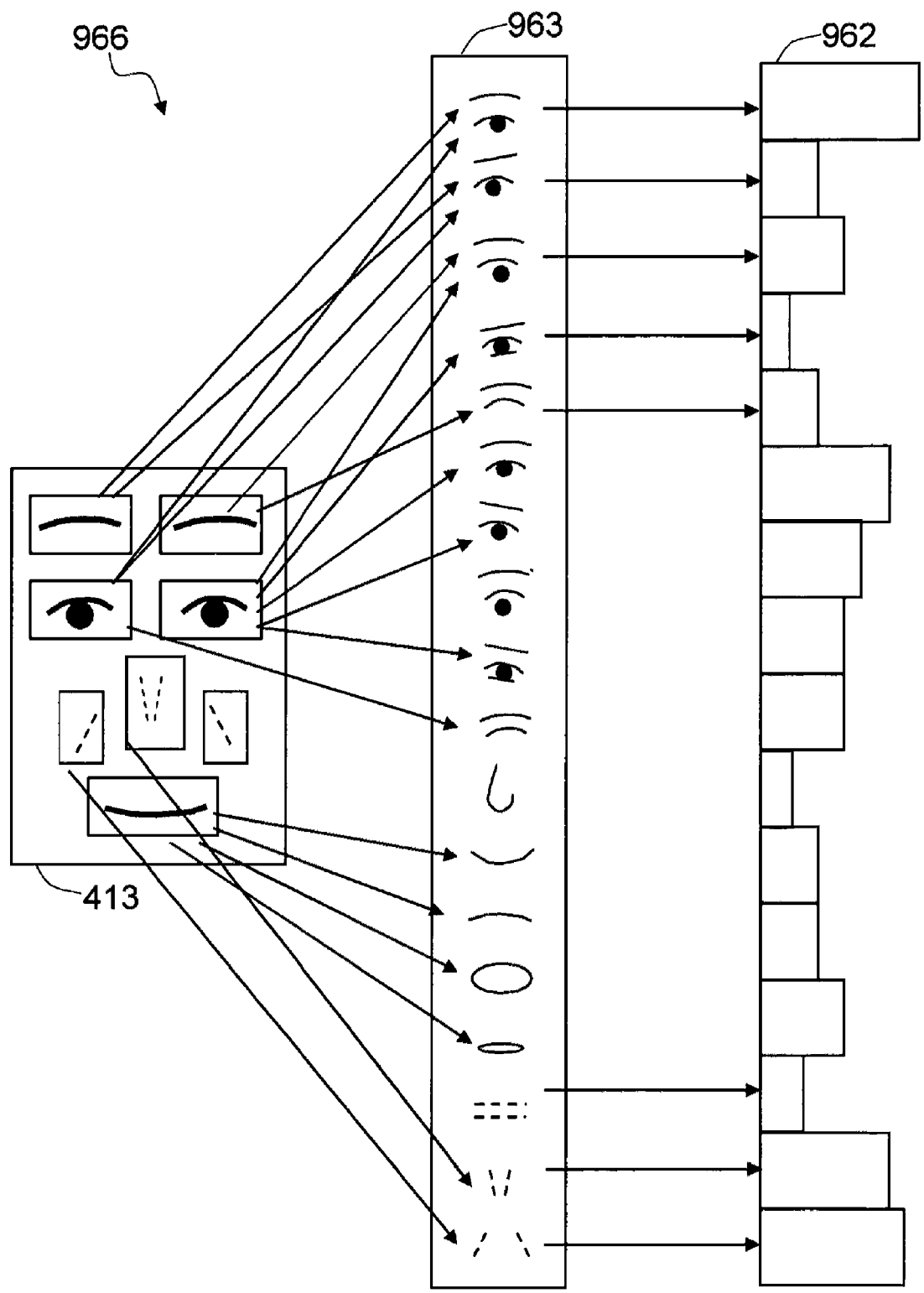
FIG. 10 shows the emotion-sensitive feature extraction scheme.

FIG. 10 shows the emotion-sensitive feature extraction 966 scheme once the emotion-sensitive feature filters 963 have been derived. The localized facial image 384 goes though the facial feature localization 410 step to generate individual features in the facial feature localized facial image 413. Then each filter in the emotion-sensitive feature filters 963 is applied to correspondingly aligned features in the image to compute the response. Effectively, the facial image is compared to many potential candidate facial expressions, and those filters matching the true facial expression are supposed to yield high responses. All of the responses are collected in the emotion-sensitive feature vector 962.

Figure 11:
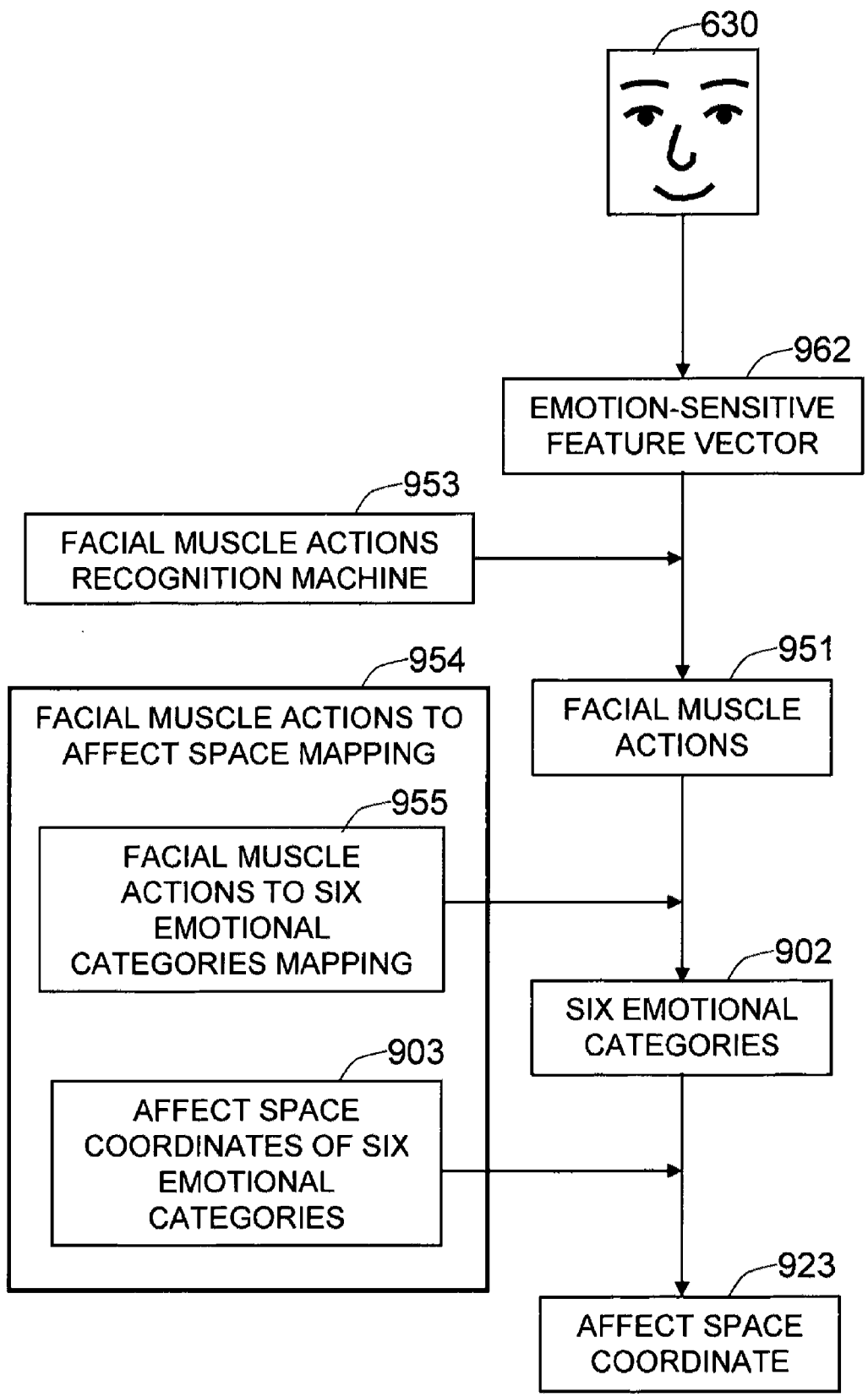
FIG. 11 shows an overview of the facial muscle actions recognition and facial muscle actions to affect space mapping.

FIG. 11 shows an overview of the facial muscle actions recognition 952 and facial muscle actions to affect space mapping 954. Once the emotion-sensitive feature vector 962 has been computed from the input facial image 630, it is fed to the facial muscle actions recognition machine 953 to estimate the likelihood of the facial image having each of the facial muscle actions 951. In an exemplary embodiment, the FACS (Facial Action Coding System) Action Units 956 are employed to represent the facial muscle actions 951. In this exemplary embodiment, the facial muscle actions recognition machine 953 outputs the 32-dimensional vector, where each component represents the likelihood of the given facial image displaying one of the corresponding Action Units 956. The facial muscle actions to six emotional categories mapping 955 then interprets the facial muscle actions 951 to the six emotional categories 902, based on the known relationship described in FIG. 12. The six emotional categories 902 have fixed coordinates in the affect space 903; the information is used to map the six emotional categories to an affect space coordinate 923, which is a representation of the affective state of the person.

Figure 12:
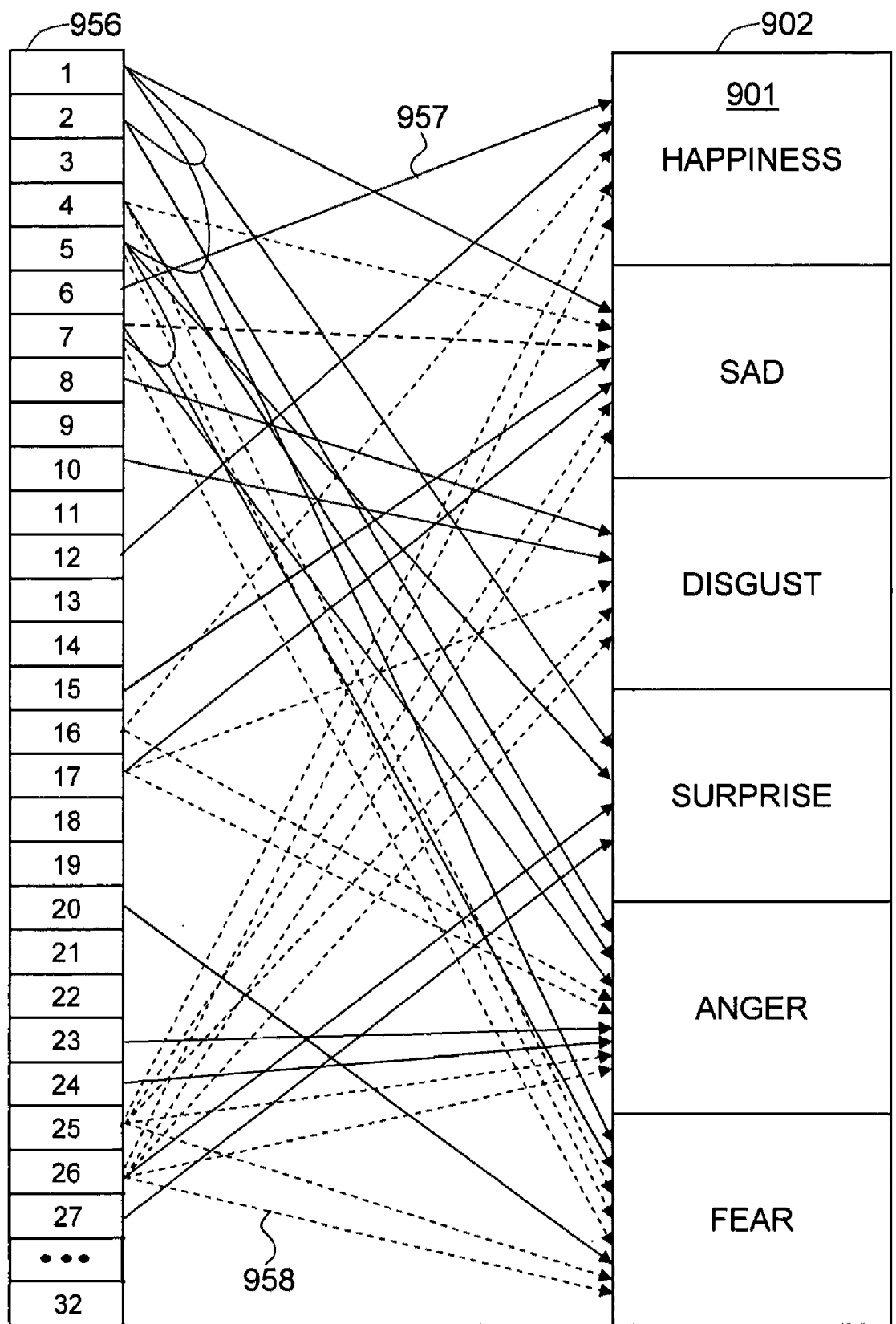
FIG. 12 shows an exemplary embodiment of the mapping from the FACS Action Units to the six emotional categories from a known relation between the two representations.

FIG. 12 shows an exemplary embodiment of the mapping from the FACS Action Units 956 to the six emotional categories 902 from a known relation between the two representations. A subset of the FACS Action Units 956 belongs to an emotional category as a manifestation of the emotion. The FACS Action Units are divided into primary visual cues 957 and auxiliary visual cues 958. The primary visual cues 957 are the Action Units that always accompany the manifestation of the emotion. The auxiliary visual cues 958 are the Action Units that do not necessarily accompany the expression at all times but can serve as additional evidence. The strong association between the primary visual cues 957 and the corresponding emotional category 901 is represented by arrows with solid lines. The weak association between the auxiliary visual cues 958 and the corresponding emotional category is represented by arrows with dashed lines. For example, if a facial image shows AU 6, AU 12, then it is very highly likely that the face is expressing "Happiness." The occurrence of AU 25, Au 26, and AU 16 will provide additional evidence to the decision.

Figure 13:
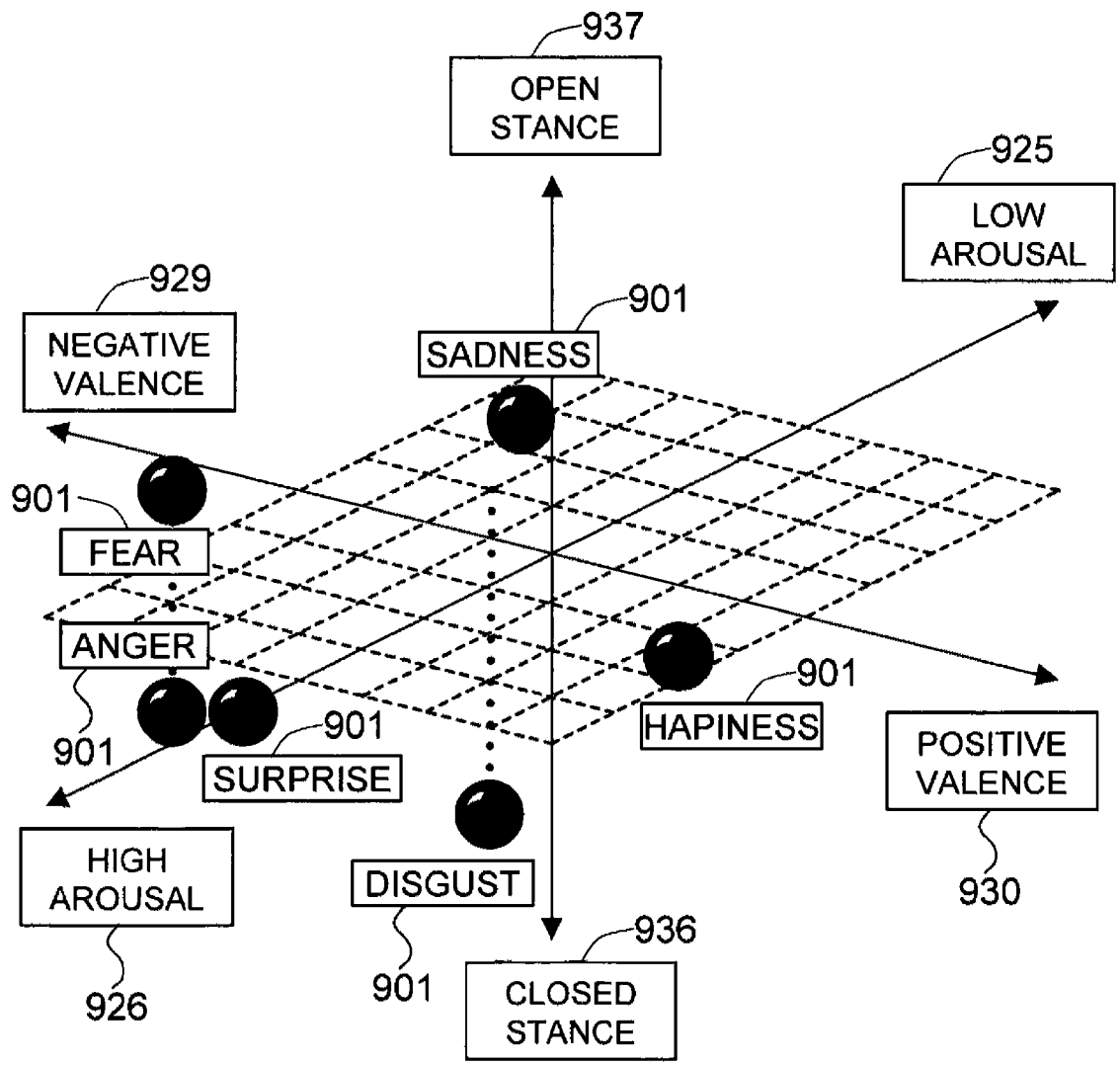
FIG. 13 shows a spatial arrangement of the six emotional categories in the three-dimensional affect space.

FIG. 13 shows a spatial arrangement of six emotional categories in the three-dimensional affect space 922. This relation effectively constrains a mapping from the space of six-dimensional emotion categories to the three-dimensional affect space 922, so that the estimated facial muscle actions 951 can be projected into the affect space 922. The affect space 922 encodes human response characteristics in a more direct manner, employing the notions of arousal 924, valence 928, and stance 935; the present invention assumes that these affective states provide information more directly relevant to the recognition of people's response toward a visual stimulus. For example, the degree of valence directly reveals the positive or negative attitude.

Figure 14:
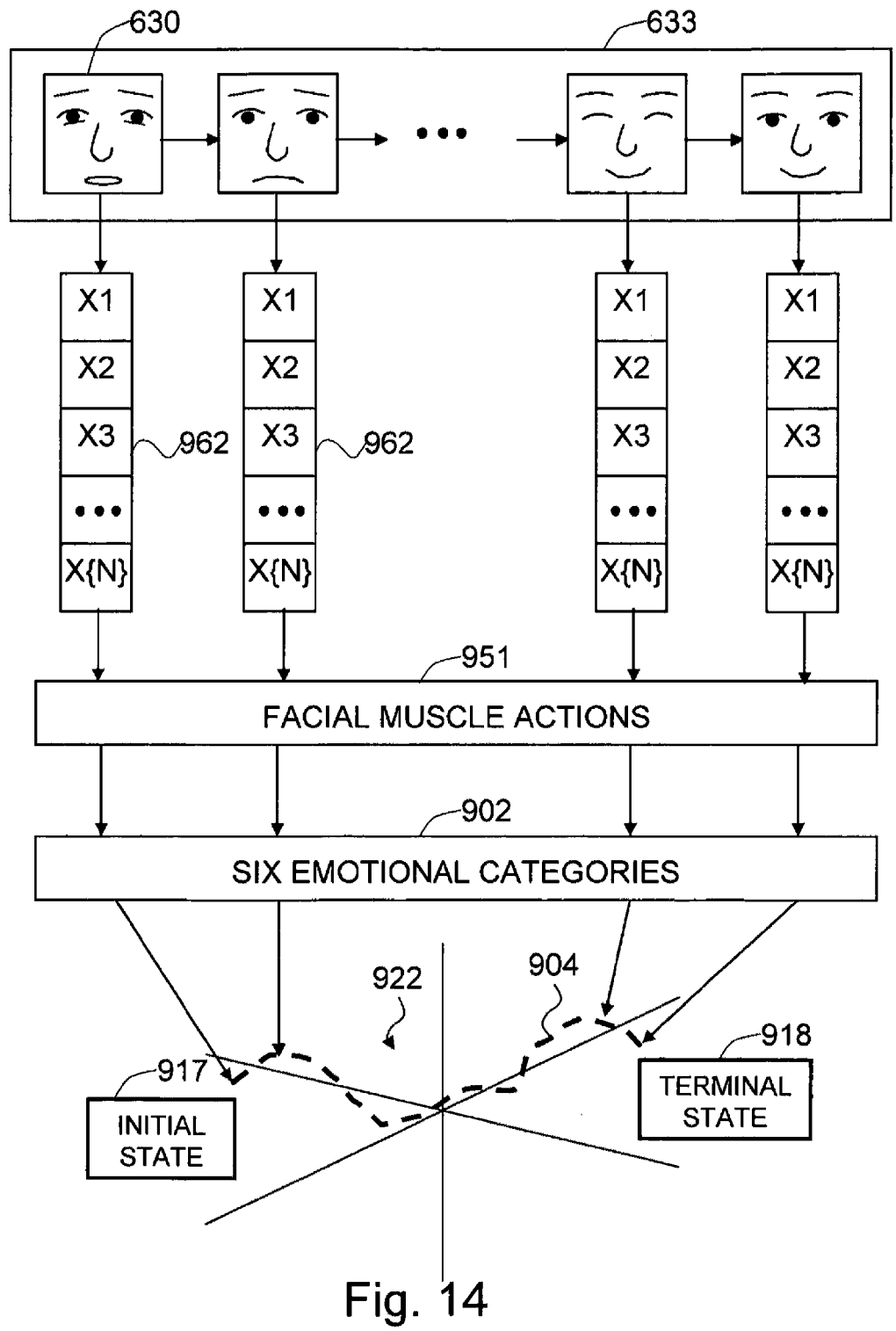
FIG. 14 shows an exemplary embodiment of how the measured instances of facial muscle actions from a sequence of facial images are projected into the affect space to construct a sequence of affective state.

FIG. 14 shows an exemplary embodiment of how the measured instances of facial muscle actions 951 from a sequence of facial images 633 are projected into the affect space 922 to construct a sequence of affective state 904. From a sequence of facial images 633, an emotion-sensitive feature vector 962 is extracted from each facial image 630. The facial muscle action recognition 952 step then finds the facial muscle actions 951 corresponding to the emotion-sensitive feature vector 962. The facial muscle actions 951 then determines the likelihood of the manifested expression belonging to each of the six emotional categories 902. Then the likelihoods determine the coordinate of the instance of emotion in the affect space 922. A series of such estimations from the sequence of facial images 633 generates a sequence of affective state 904 in affect space 922.

Figure 15:
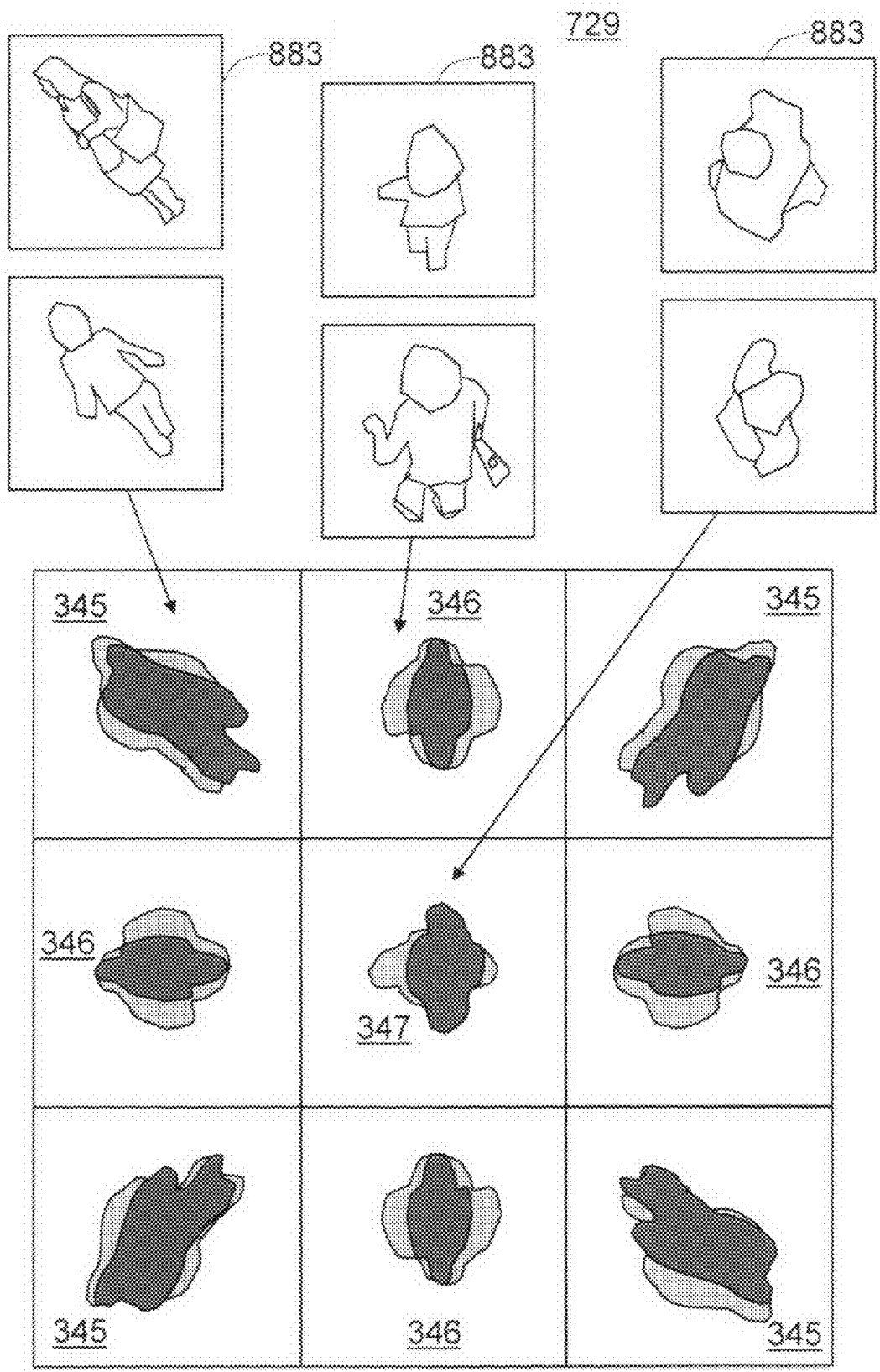
FIG. 15 shows the body orientation estimation training step in an exemplary embodiment of the present invention.

FIG. 15 shows the body orientation estimation training 729 step in an exemplary embodiment of the present invention. In this embodiment, a top-down camera is used to capture the body image sequence 715; the appearance changes due to the changes in body orientation depend on the distance from the camera axis in the top-down body camera view. The camera view is divided into nine regions to deal with the orientation estimation independently. The body images captured from the corner region 345, called view-dependent training images 883, are used to train a learning machine to estimate the body orientation for that region. The same machine can be used to handle other corner regions. The body images captured from a side region 346 can be used to train a learning machine to handle other side regions. The body images captured from the center region 347 are used to train the learning machine to estimate the body orientation at that region. Once all of the machines have been trained using the view-dependent training images 883, a detected body image is fed to the machine that handles the region that the body is positioned. In another embodiment, multiple learning machines cooperate to estimate the body orientation, taking into account the distance of the detected body image to the corresponding regions in which the machines take part.

Figure 16:
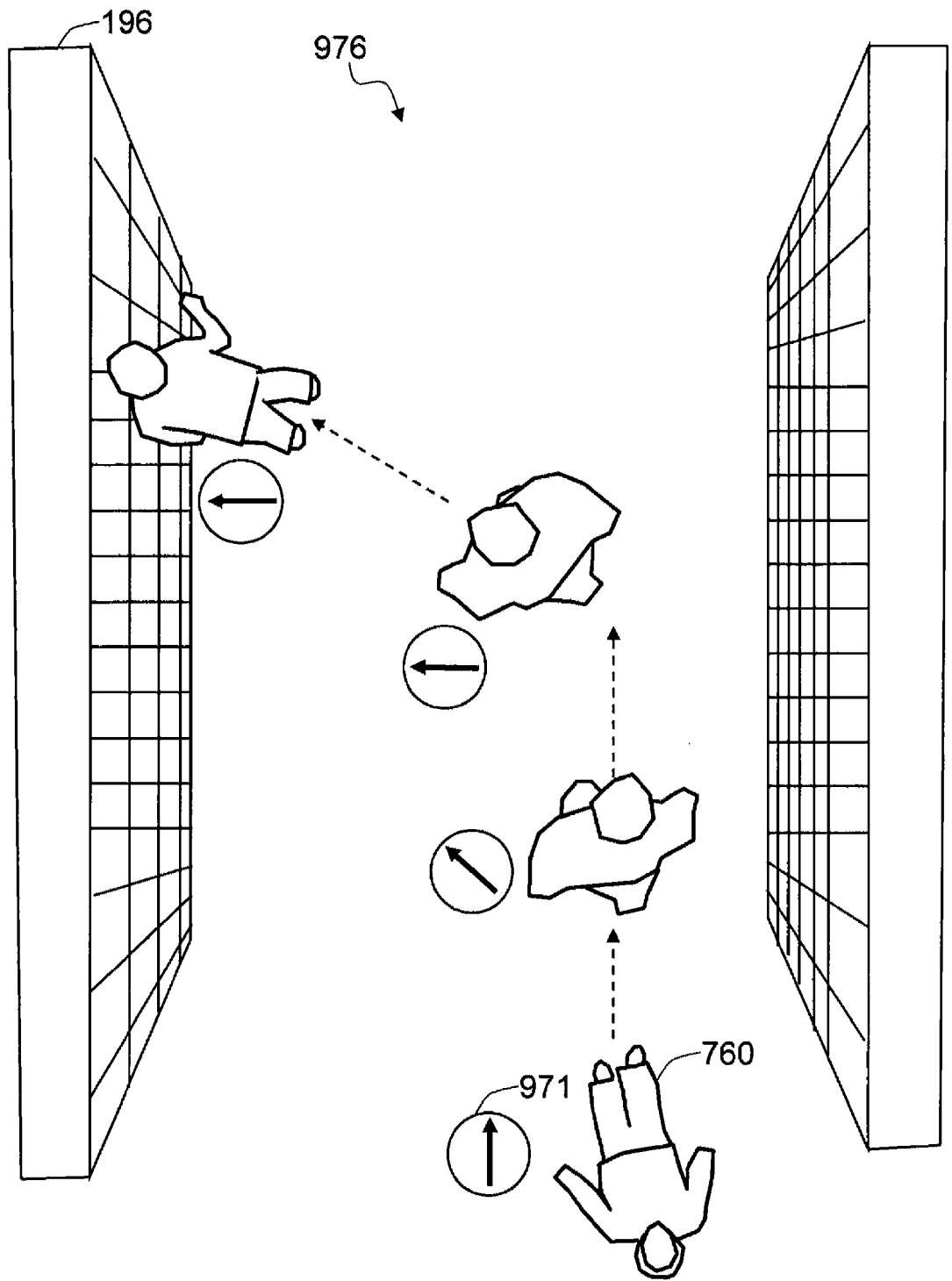
FIG. 16 shows an exemplary scenario of the gross-level interest estimation step. The circled arrows represent the direction of interest of a shopper.

FIG. 16 shows an exemplary scenario of the gross-level interest estimation 976 step. The circled arrows represent the direction of interest 971 of a shopper 760. The estimated gross-level interest of the shopper can be used to associate the emotional response to the visual interest changes so that the emotional response can be analyzed in relation to the target of interest—the visual element to which the shopper has responded. In the Figure, the shopper 760 notices a shelf space 196 holding a product or a brand of interest, and changes the walking direction toward the space; the changes in the direction of interest 971 are manifested by the trajectory and the body orientation 725 of the shopper 760 at later instances. The shopper can also pause to further decide whether she/he would approach the shelf space 196 or further look for other products. All of, these behaviors directly or indirectly reveal the direction to which or the target at which the shopper is currently directing attention. The present invention adapts a statistical model to estimate the orientation of attention using the track and body orientation data.

Figure 17:
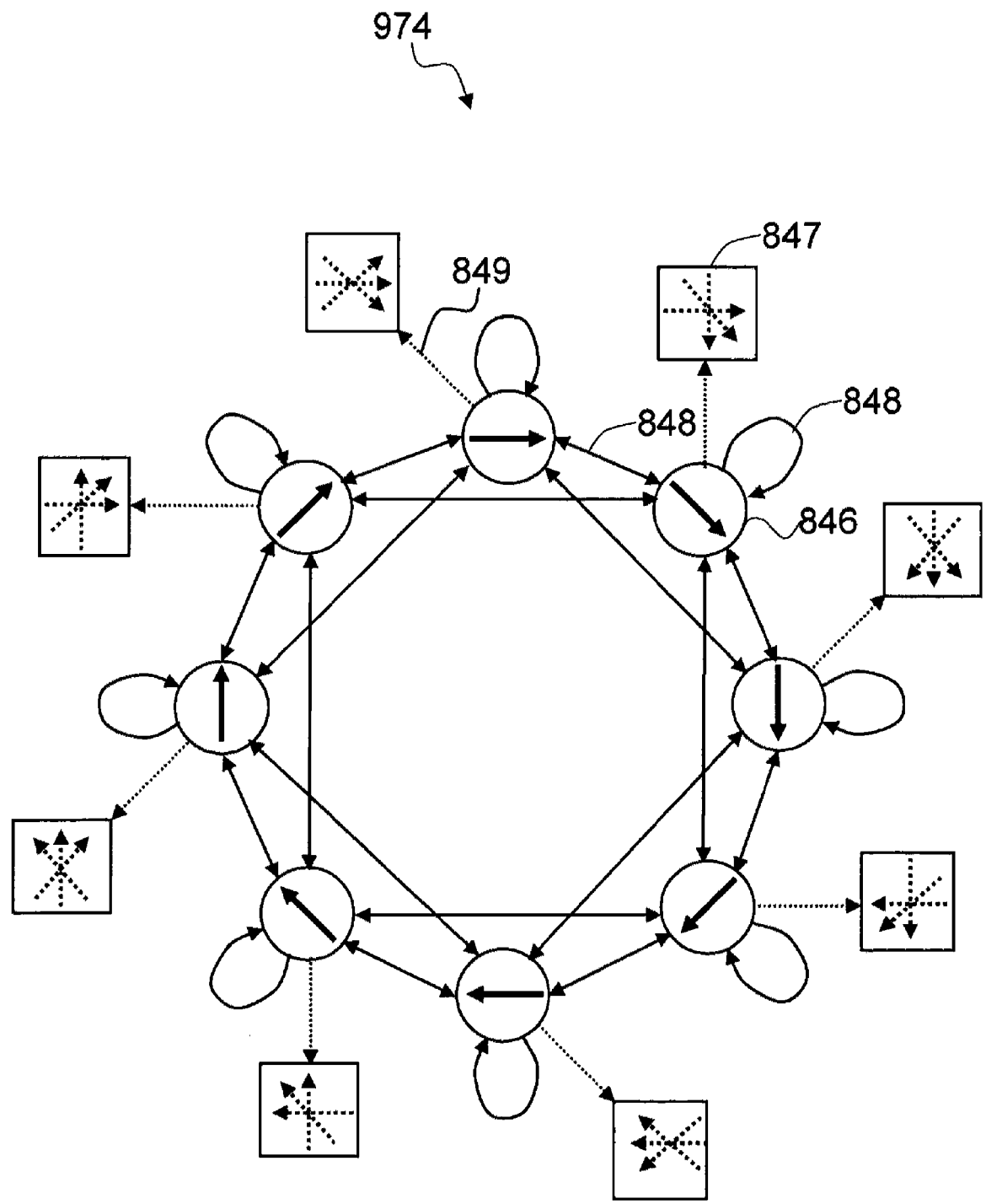
FIG. 17 shows the gross-level interest estimation training step in an exemplary embodiment of the present invention.

FIG. 17 shows the gross-level interest estimation training 974 step in an exemplary embodiment of the present invention. In the embodiment, the track and body orientation history is used to estimate the visual target of interest. The step employs the Hidden Markov Model (HMM) as the state transition and uncertainty model that associates the shopper's movement (including the body orientation) with the target of the interest. The model is designed around the assumption that the direction and the speed changes of a shopper reflect the current direction of interest 971 of the shopper, and the relation can be understood in the graphical Bayesian framework such as the HMM. In the model, the hidden state 846 is one of the eight orientations of the shopper's visual interest or attention (direction of interest 971). The track history is the observable state 847 that has some unknown statistical correlation with the orientation of interest. The state transition 848 has a smoothness constraint restricting the change of direction by at most 90 degrees at a time. The observation likelihood 849 is modeled as a Gaussian distribution. The HMM can be trained on a large number of training data using a standard HMM training algorithm such as the Baum-Welch algorithm.

Figure 18:
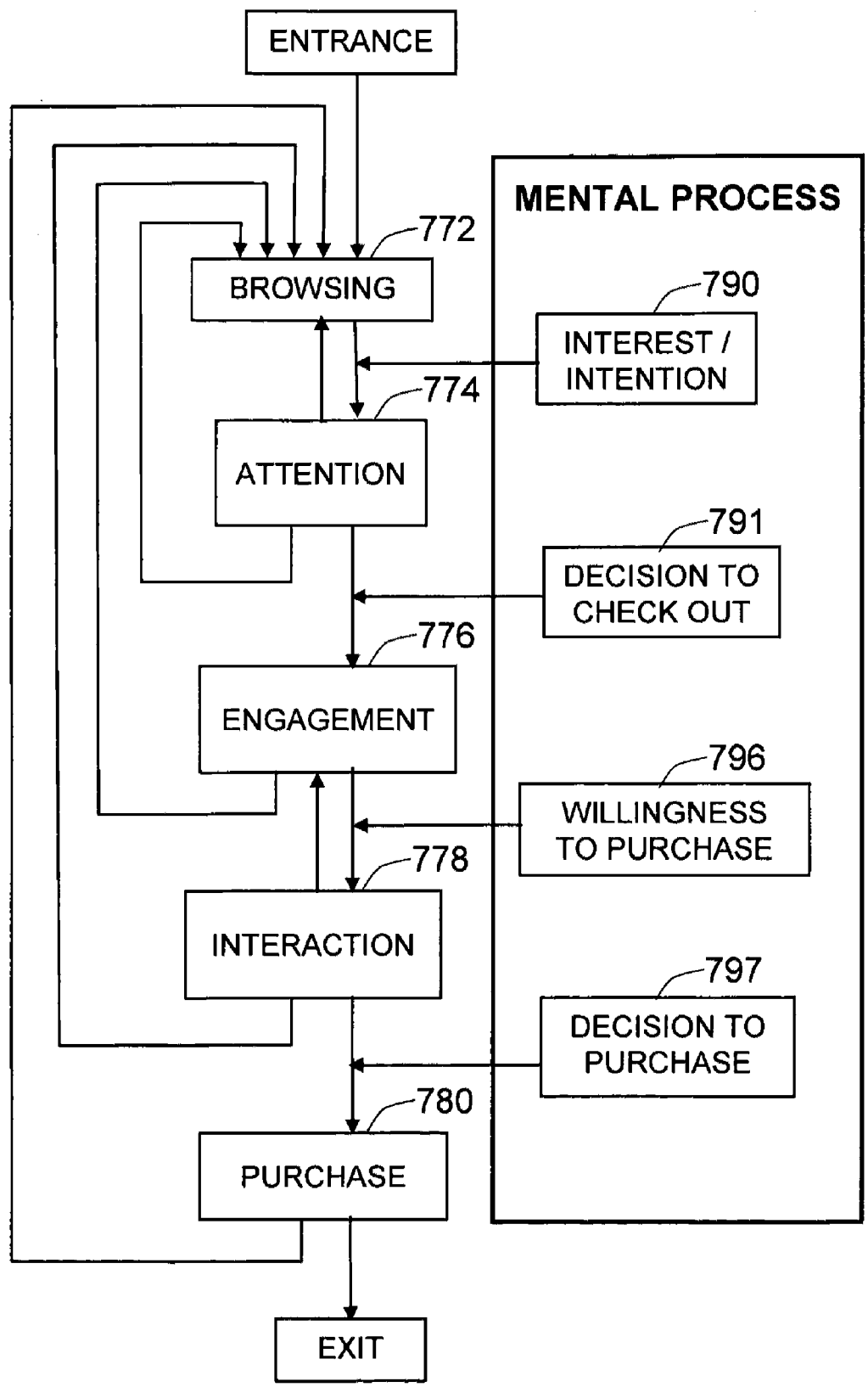
FIG. 18 shows a model of shopper behaviors as observable manifestations of the shopper's mental responses or decisions.

FIG. 18 shows a model of shopper behaviors as observable manifestations of the shopper's mental process. Once a shopper is in the store, she starts browsing 772 through the store aisles. When she takes notice of a visual element—such as a product, a product category, or a promotion—that captures her interest 790 (or that she had an original intention 790 to buy), then she reveals her interest by stopping or turning toward it (attention 774 phase). If she makes a decision to more closely investigate the products 791, then she approaches the shelf space and pauses; she enters the engagement 776 phase where she further investigates products with an intention to purchase if she decides to do so. If she becomes serious about purchasing 796 one of the products, then the shopping is in the interaction 778 phase; she picks up a particular product to check the price, read labels, or make a comparison to other products. Once she makes a final decision to purchase 797, then she puts the product in the shopping basket or cart (purchase 780 phase). In any of the phases, the shopper can return to any of the previous phases or exit the store. But in most cases, she returns to the browsing 772 phase. This dynamic model of the shopping scenario provides a basis to design a series of image analysis procedures, so that the behavior of a shopper over time can be automatically divided into meaningful behavioral segments; in each segment, the measured affective state or the level of interest of the shopper can be interpreted differently, so that the overall response at the end of the scenario can be predicted under the context of these behavioral cues.

Figure 19:
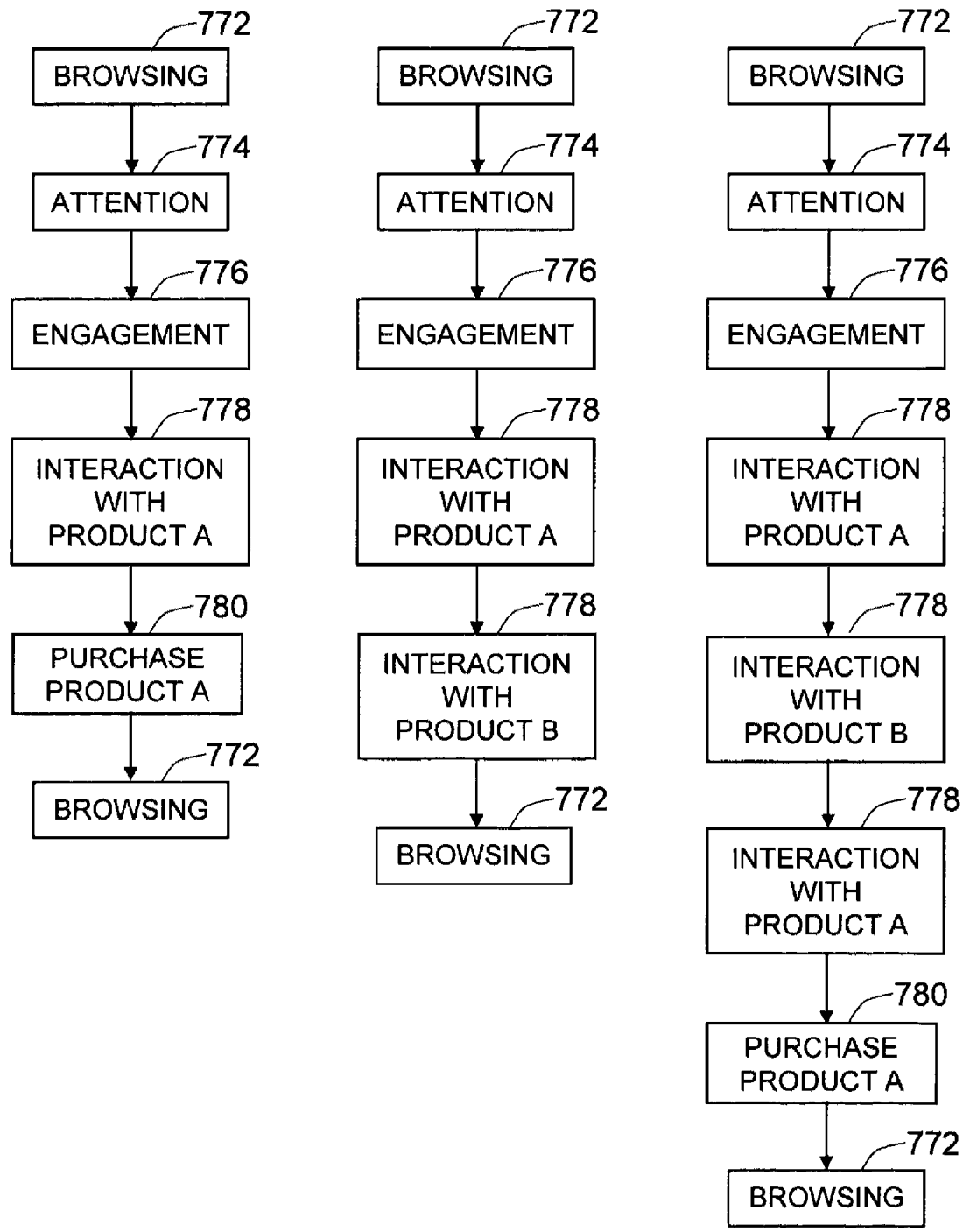
FIG. 19 shows different shopping scenarios based on the shopper behavior model described in FIG. 18.

FIG. 19 shows different shopping scenarios based on the shopper behavior model described in FIG. 18. In the first column, the shopper interacts with one product (product A), makes a purchase, and keeps browsing for other products. In the second column, the shopper interacts with both product A and product B, but does not make a decision to purchase either. In the third column, the shopper first interacts with product A, makes a comparison to product B, and returns to product A for further investigation before finally making a decision to purchase product A. The shopper behavior is analyzed according to this model based on the visual information from the body image sequence 715 and the facial image sequence 633.

Figure 20:
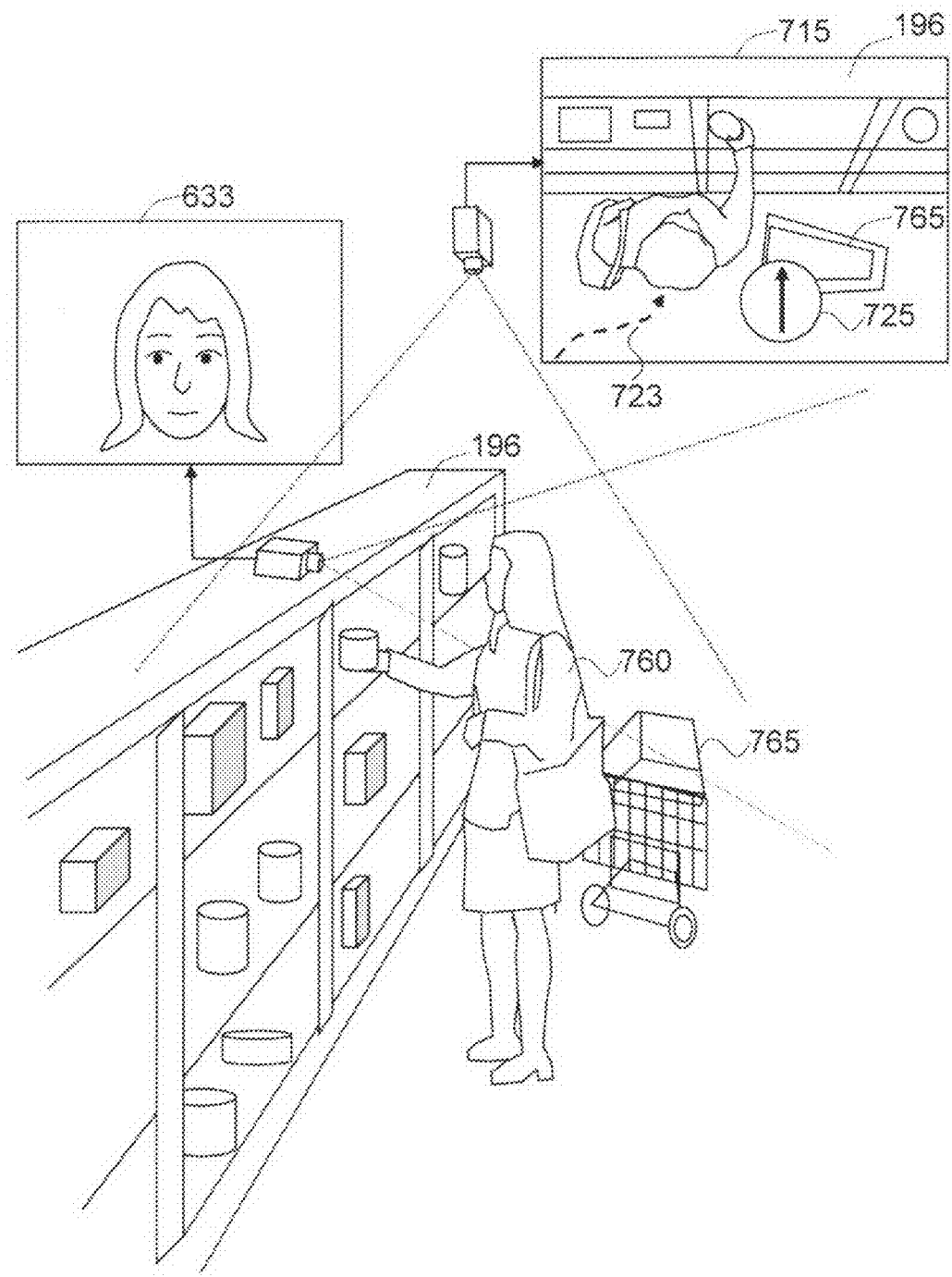
FIG. 20 shows an exemplary operational scenario of the shopper engagement detection and interaction recognition.

FIG. 20 shows an exemplary operational scenario of the shopper engagement detection 777 and interaction recognition 779. When a shopper 760 approaches a shelf space 196, the combination of the proximity measure of the shopper 760 to the shelf space 196 and the shopper's body orientation 725 provides a basis to decide whether the shopper is engaging with the products or is just standing without any interest in the nearby products. The body detection and tracking 722 step provides the current position of the shopper in the body track 723, so that the proximity of the shopper 760 to the shelf space 196 can be readily estimated. When the shopper closely examines the prices or labels, or reaches out to a product to pick it up, the system detects the occurrence based on the foreground object analysis of the scene—more specifically, the scene between the shelf space 196 and the shopper 760. The product purchase can also be detected based on the foreground object analysis of the shelf space 196 and the cart 765. The facial image of the shopper is captured by a camera near the shelf, and the facial image sequence 633 is processed to estimate the gaze and the emotional response. The fine-level interest estimation 976 step further identifies the target of interest, such as a product, price, or labels, based on the estimated gaze and the recognized interaction with products.

Figure 21:
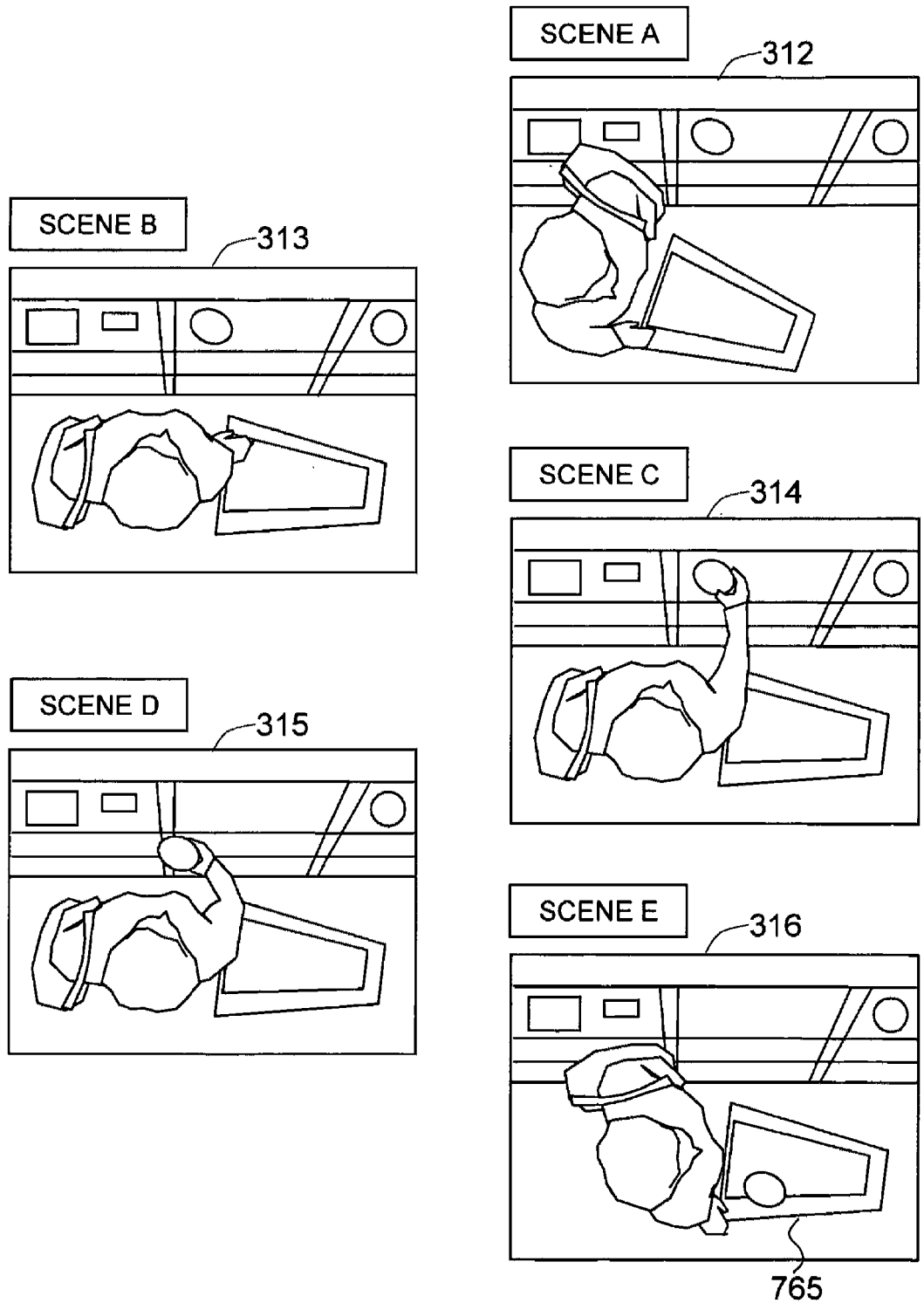
FIG. 21 shows engagement detection, interaction recognition, and purchase detection schemes based on the body image sequence, in an exemplary embodiment of the present invention.

FIG. 21 shows engagement detection 777, interaction recognition 779, and purchase detection 781 schemes based on the body image sequence 715, in an exemplary embodiment of the present invention. In scene A 312, the shopper is close enough to the shelf space, so that proximity (provided from the body detection and tracking 722 step) alone can identify the incident as shopper engagement. However, based on the body orientation of the shopper estimated from the body orientation estimation 726 step, the shopper is not engaged with products. In scene B 313, both the proximity information and the body orientation information can correctly detect a shopper engagement with products on the shelves. In scene C

314, an occurrence of the shopper reaching out her arm toward the shelf can be detected from the foreground object analysis that is focused on the space between the shopper and the shelf; in effect, the shopper interaction is detected. In scene D 315, an occurrence of a shopper interaction with a product—more specifically, an instance of picking up a product—is detected based on the foreground object analysis that is focused on the shelf space close to the shopper. In scene E 316, an occurrence of product purchase is detected based on the foreground object analysis focused on both the shelf space close to the shopper and the shopping cart 765 that belongs to the shopper.

Figure 22:
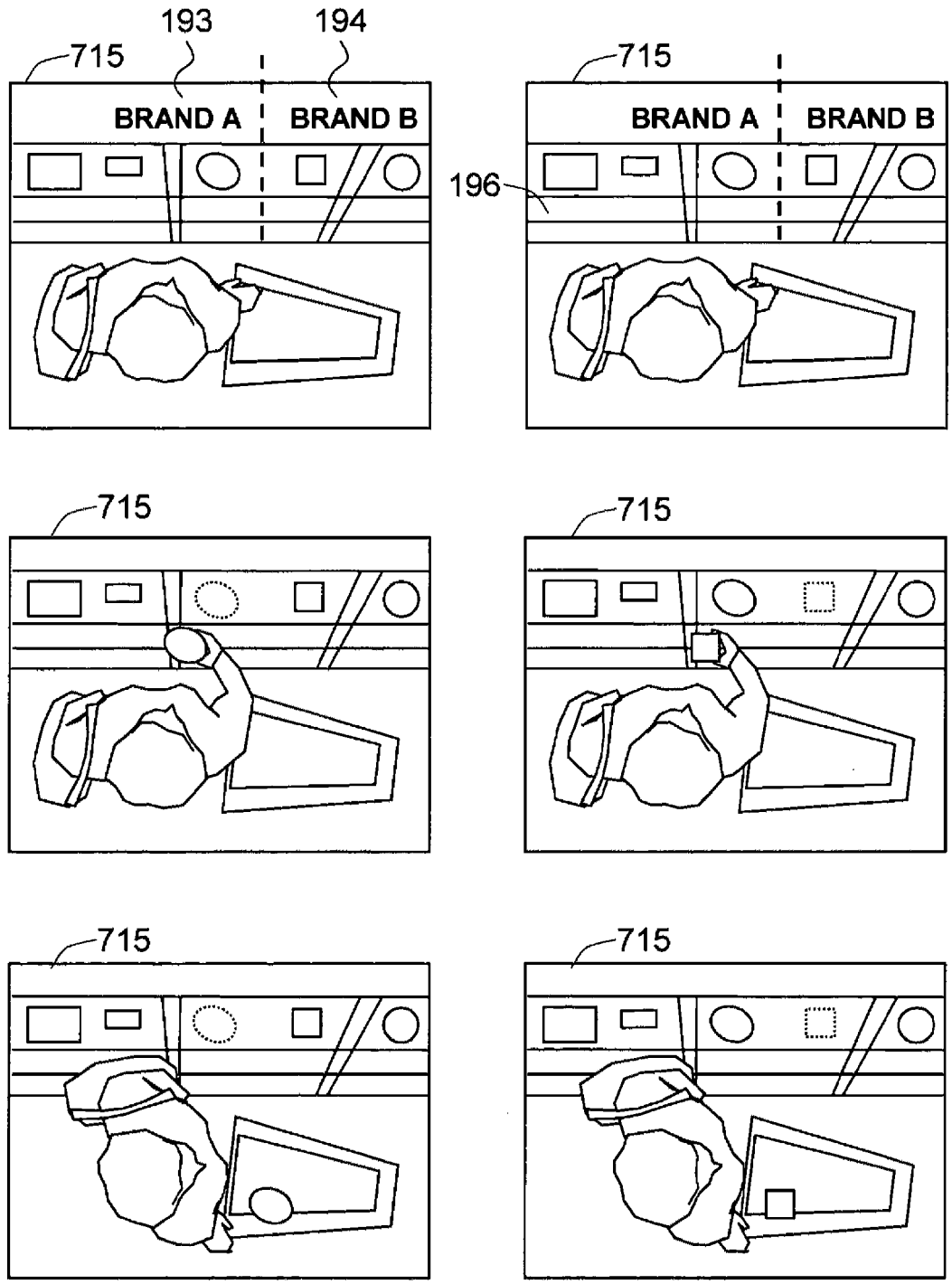
FIG. 22 shows an exemplary embodiment of the fine-level interest estimation based on the body image sequence.

FIG. 22 shows an exemplary embodiment of the fine-level interest estimation 976 based on the body image sequence 715. In this embodiment, the system is provided with a plan of the shelf space 196 from the top-down camera views so that the target of the shopper's current interest can be identified; the shelf space is divided into sections, where each section represents a product, a product category, or a brand. When a customer interacts with a product, the product (or the category or brand) can be identified based on a foreground object analysis focused on the shelf space or the space between the shopper and the shelf. The purchased product (or the category or brand) can also be identified in the same way, based on a foreground object analysis focused on the shelf and the shopping cart. In the Figure, the interaction with a brand A product 193 and the purchase of a brand A product 193 are illustrated in the first column. The interaction with a brand B product 194 and the purchase of a brand B product 194 are illustrated in the second column.

Figure 23:
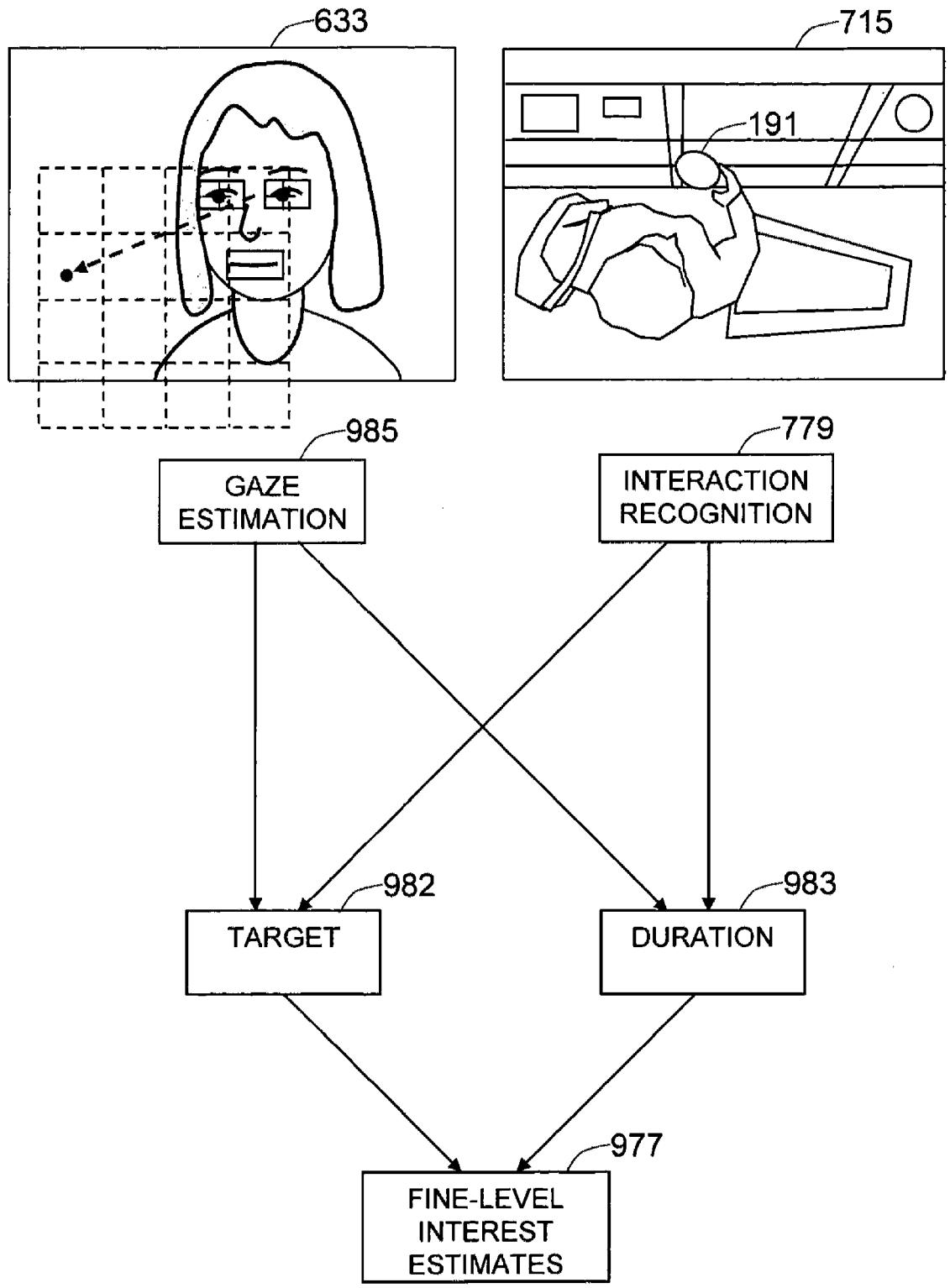
FIG. 23 shows an exemplary embodiment of the fine-level interest estimation based on both the body image sequence and the facial image sequence.

FIG. 23 shows an exemplary embodiment of the fine-level interest estimation 976 based on both the body image sequence 715 and the facial image sequence 633. In this embodiment, the fine-level interest of the shopper is estimated based on both the gaze estimation 985 from the facial image sequence 633 and the interaction recognition 779 from the body image sequence 715. The gaze estimation 985 first performs a rough estimation of the orientation of the shopper using the facial pose estimation 380. Then the estimate is refined by comparing the eye positions and iris positions extracted from the facial feature localization 410 step; the gaze direction measured from the deviation of the iris positions from the eye center is added to the estimated facial orientation. The interaction recognition 779 step identifies the product 191 or the brand with which the shopper is currently interacting, and the gaze estimation 985 confirms whether the shopper is currently paying attention to the product 191 or other products. This procedure effectively identifies the target 982 of the interest and the duration 983 of the interest which comprise the fine level interest estimate 977.

Figure 24:
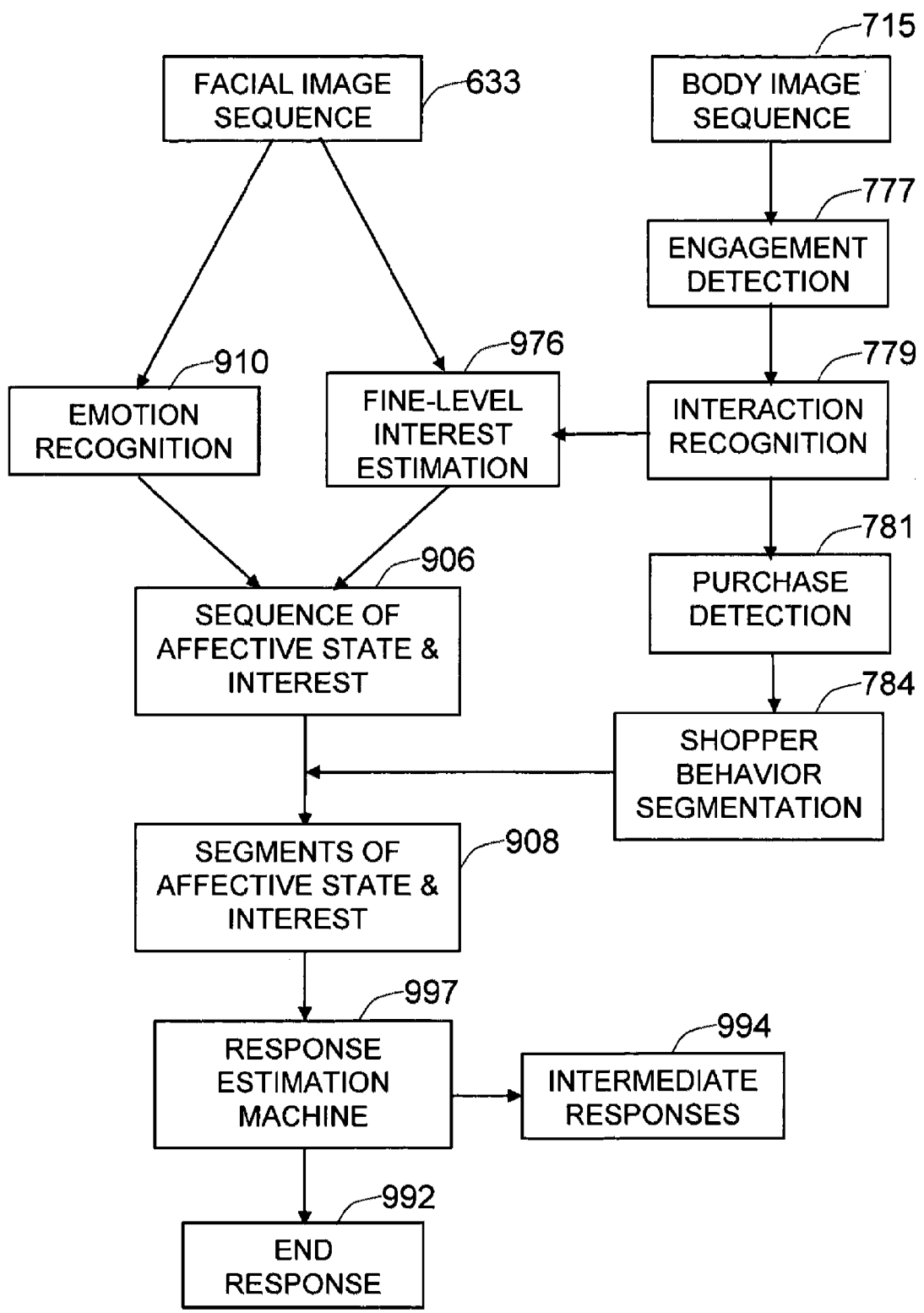
FIG. 24 shows an overview of the response estimation step in an exemplary embodiment of the present invention.

FIG. 24 shows an overview of the response estimation 991 step in an exemplary embodiment of the present invention. After a series of facial image sequence 633 processing steps, the emotion recognition 910 step and the fine-level interest estimation 976 step generate a sequence of affective state and interest 906. From the body image sequence 715, the incidents of engagement, interaction, and purchase are detected and provide timestamps to segment the sequence of affective state and interest 906; the shopper behavior segmentation 784 step generates segments of affective state and interest 908. The identified target of interaction also helps to estimate the fine-level interest 975 in the fine-level interest estimation 976 step. The segments of affective state and interest 908 are fed to the response estimation machine 997, where a Bayesian graphical model, such as the Hidden Markov Model, is employed to estimate the end response 992 as well as the intermediate responses 994 which are the changes in a shopper's attitude toward a given product. The notion of end response 992 includes the likelihood of a purchase, a rating for the purchased product, the degree of satisfaction, etc.

Figure 25:
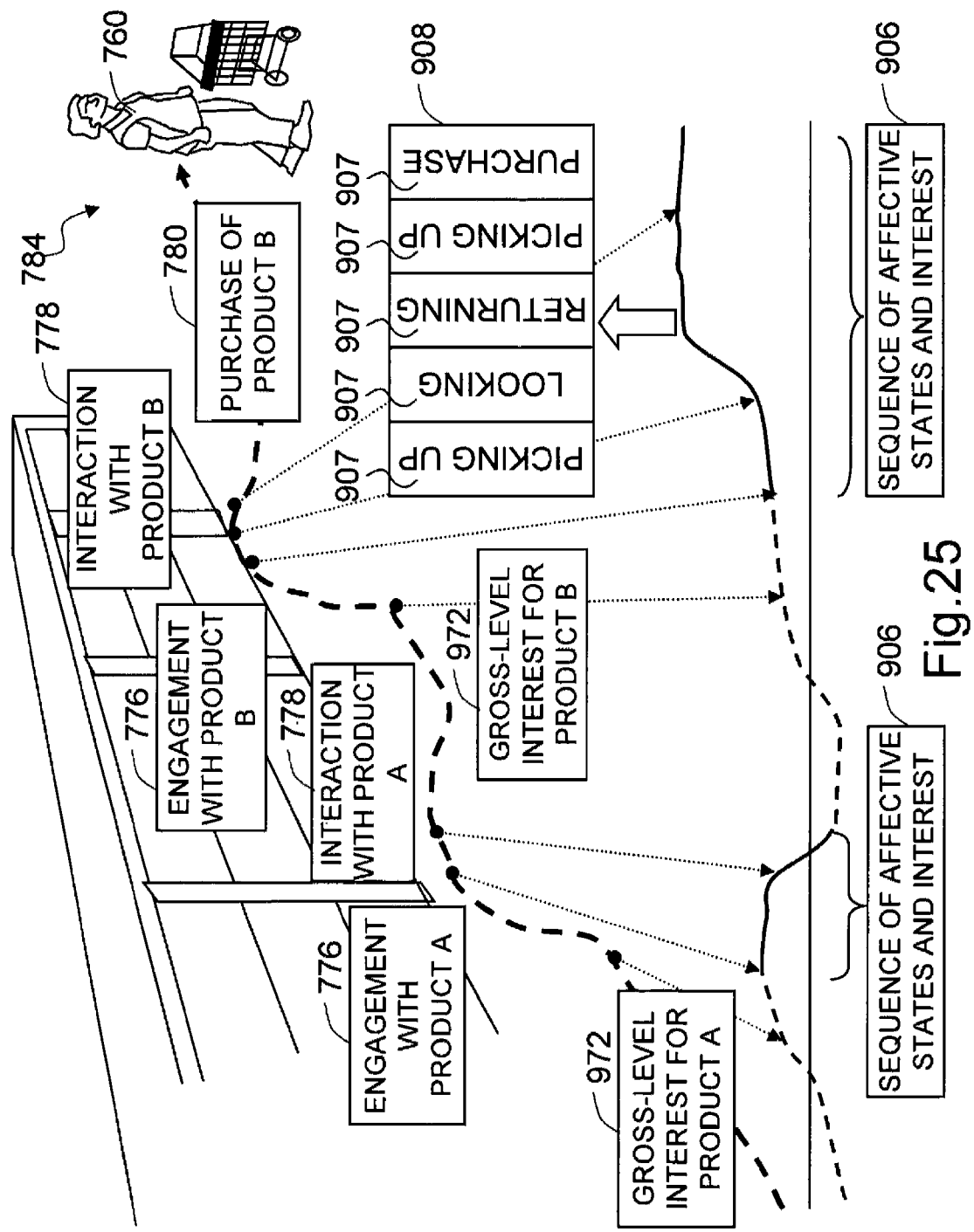
FIG. 25 shows an exemplary embodiment of the shopper behavior segmentation step.

FIG. 25 shows an exemplary embodiment of the shopper behavior segmentation 784 step. In this embodiment, the sequence of shopper behavior is divided into multiple segments, where each segment is a period wherein the shopper shows a specific shopping behavior. The system assumes that whenever a shopper 760 is in the engagement 776 phase, the shopper's face can be captured in a facial image sequence 633, so that the sequence of affective state and interest 906 can be generated. In the figure, the shopper 706 takes notice of product A (gross-level interest 972) and approaches the shelf. Then the engagement 776 with product A begins, so that the first means for capturing images 101 can capture the shopper's face. Various interactions of the shopper with product A and potentially other products are recorded, and the corresponding sequence of affective state and interest 906 is generated during the engagement 776 phase. In this episode, the shopper 760 did not make a purchase and finished the engagement 776 phase. He resumes browsing, and product B catches his attention (gross-level interest 972 for product B). He then approaches product B to begin another engagement 776 phase. The interaction 778 with product B then generates another sequence of affective state and interest 906. He decides to make a purchase 780 of product B and walks off. At this point, the second sequence of affective state & interest 906 is complete. Each of the sequences is also provided with timestamps of the meaningful events that occurred when the shopper interacted with products, such as picking up a product, reading a label, or returning a product to the shelf, so that the sequence can be divided into segments of affective state and interest 908. Each segment of affective state and interest 907 constitutes a smallest unit of measurement, where the shopper's responses are further analyzed. The figure shows the sequence of affective state and interest 906 for product B, and is divided into segments of affective state and interest 908.

Figure 26:
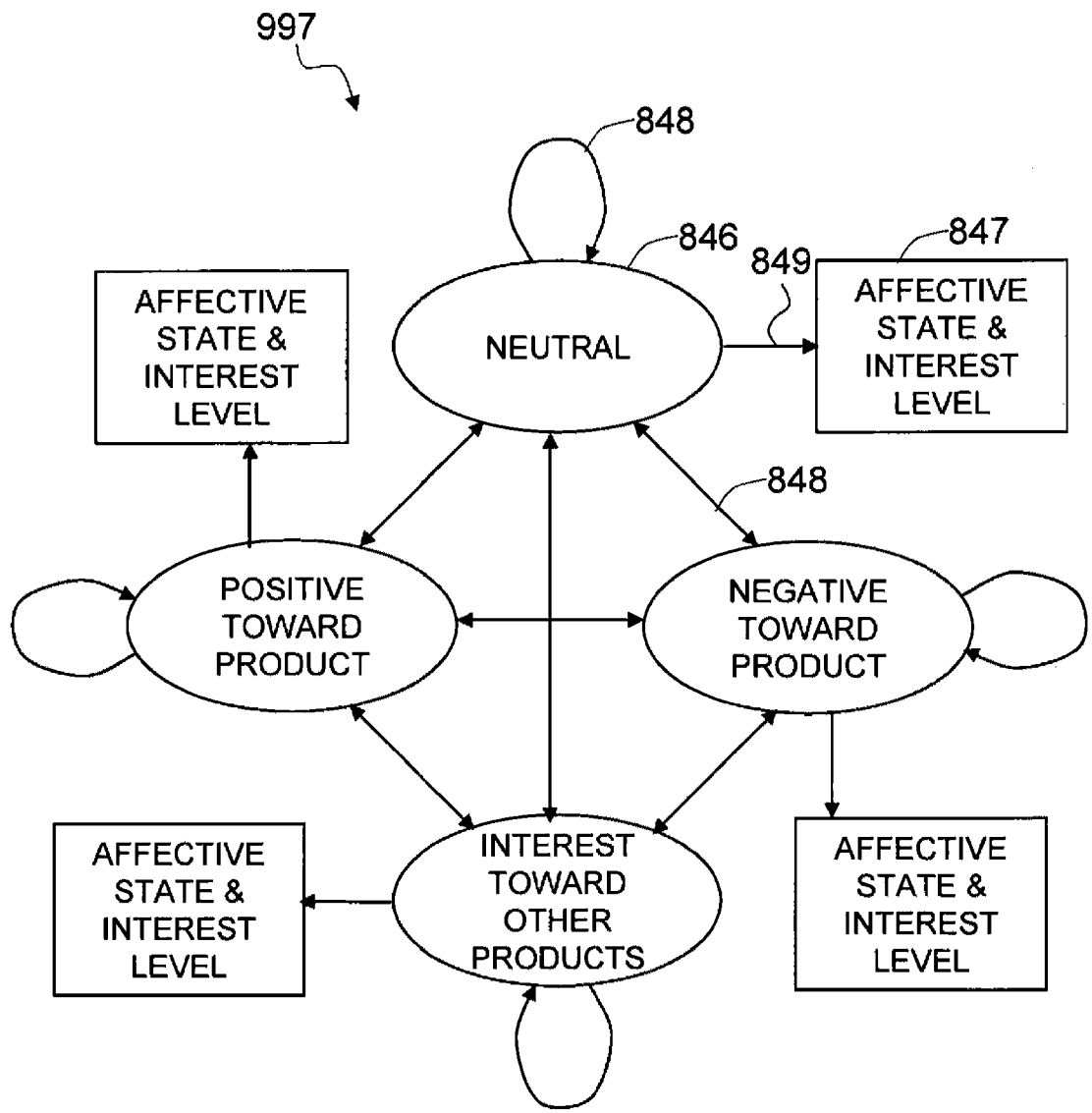
FIG. 26 shows an exemplary embodiment of the response estimation machine.

FIG. 26 shows an exemplary embodiment of the response estimation machine 997. In this embodiment, a Hidden Markov Model is used to model the dynamics of the shopper's attitude (or mental state) toward a given product, along with the uncertainty of how the mental state is manifested outwardly to affect the facial expression or the level of interest. Even though the affective state of the shopper based on the facial expression is estimated and provided to the model as one of the observations (along with the interest level), there is a difference between the notion of raw affective state and the notion of attitude toward a particular product. The model has four kinds of shopper mental states (called hidden state 846)—neutral, positive, negative, and interest in other products. The state transition 848 between the states during the engagement with a product is modeled using a state transition matrix. The observable state 847 is the segmented affective state and interest 908. Observation likelihood 849 of how likely the observable state 847 will occur given the hidden state 846 is typically modeled using a Gaussian distribution.

Figure 27:
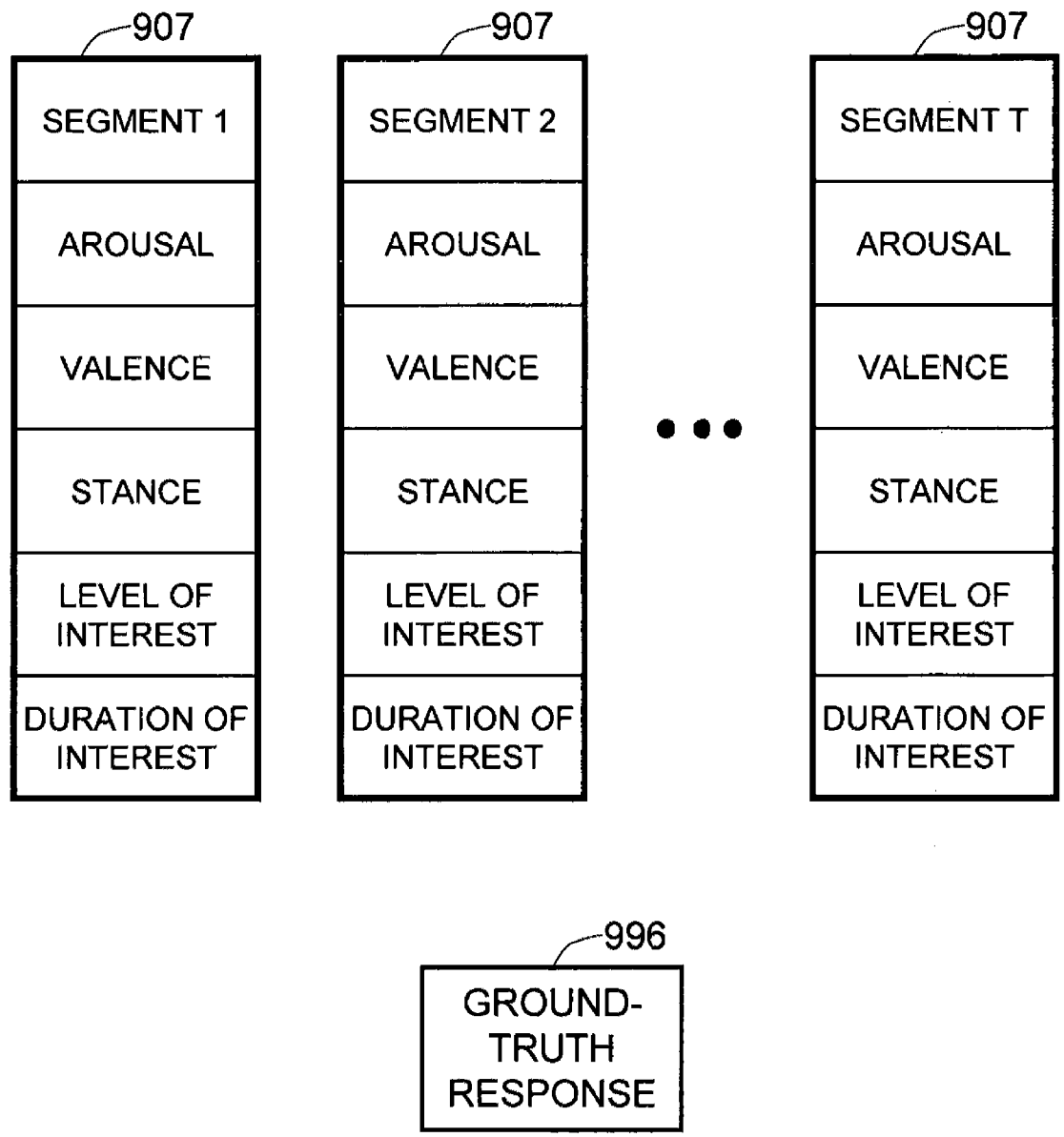
FIG. 27 shows a set of observed segments generated from the shopper behavior segmentation step.

FIG. 27 shows segments of affective state and interest 908 generated from the shopper behavior segmentation 784 step. The segments represent a variation of the shopper's affective state and the level of interest in relation to an interaction with a given product; each segment of affective state and interest 907 represents the instance of such changes in a short time interval. The segment of affective state and interest 907 can be computed by averaging the sequences of affective state and interest 906 within the time interval. The data is fed to the response estimation machine 997 to predict the end response 992 of the shopper 760. In the training stage, multiple of these sets, along with corresponding ground truth responses 996—such as purchase decisions or levels of satisfaction with the purchases—are provided to the HMM training algorithm, such as a Baum-Welch training algorithm. The ground truth responses 996 can be collected by accessing the corresponding purchase data or through customer surveys, depending on the kind of end responses. The training step produces the mean and the variance of each of the hidden states and the state transition matrix. Once these parameters are computed, the HMM accepts the set of observation segments as an input, and calculates both the most likely sequence of hidden state progressions as well as the likelihood of the given observation segments belonging to the category of response represented by the HMM. For example, when the HMM has been trained to represent the "likely to purchase" response, then the output from the HMM represents the likelihood to purchase the given product.

Figure 28:
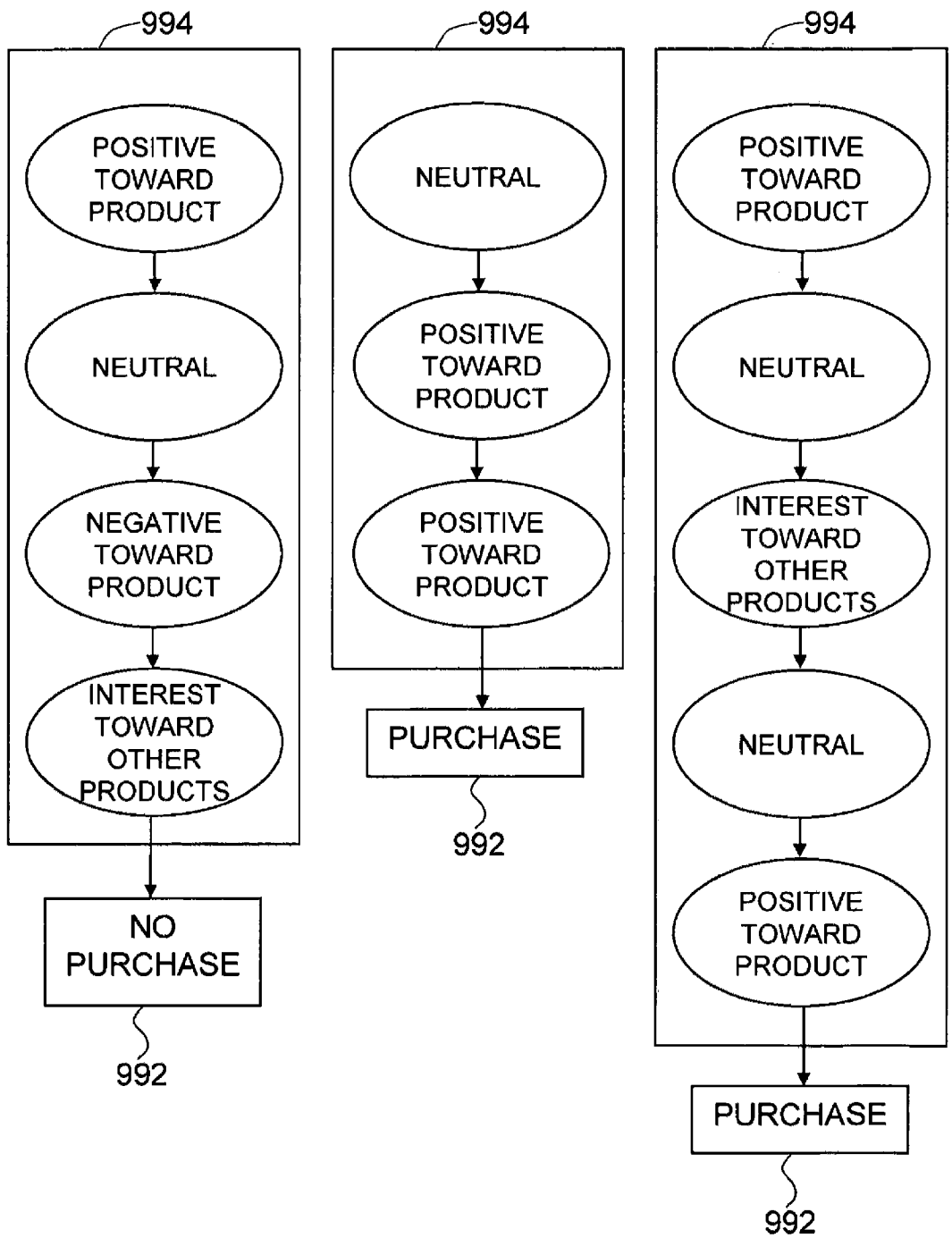
FIG. 28 shows exemplary instances of estimated state progression along with the estimated response.

FIG. 28 shows exemplary instances of estimated intermediate responses 994 (state progression) along with the estimated end response 992. The shopping episode in the first column reveals that the shopper's first attitude toward the given product is estimated as positive. Then, for some reason (such as further information provided by the label), the shopper's attitude turns to neutral, and finally becomes negative. Then the shopper notices a competing product nearby, and shows interest toward the product. The HMM predicts that the shopper's emotional attitude changes don't result in the purchase of the product of interest. In the third column, the HMM estimates that the shopper also starts out as positive, and grows neutral after checking some information (such as price). Then she becomes interested in a competing product nearby and checks the label. For some reason (such as not satisfied with some of the features of the competing product), the shopper becomes positive again with the original product. The HMM predicts that the shopper would purchase the product based on the observed sequence of affective state and interest.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining a person's response to a retail element, based on the person's facial expression and shopping behavior, comprising the following steps of:
   a) detecting and tracking a face from first input images captured by at least a first means for capturing images, estimating two-dimensional and three-dimensional poses of the face, and localizing facial features, using at least a control and processing system,
   b) estimating gaze direction of the person using the two-dimensional and three-dimensional poses and positions of the facial features and changes in affective state of the person by extracting emotion-sensitive features, and recognizing a demographic category of the person,
   c) detecting and tracking the person from second input images captured by at least a second means for capturing images, producing a trajectory of the person, and estimating body orientation, using the control and processing system,
   d) identifying the shopping behaviors of the person toward the retail element, utilizing position and the body orientation of the person relative to the retail element, and
   e) determining intermediate responses and end response of the person to the retail element by analyzing the changes in affective states and interest, in the context of the shopping behavior and the demographics category of the person,
   wherein the first means for capturing images and the second means for capturing images are connected to the control and processing system via at least a means for video interface, and wherein the shopping behaviors include showing interest, engagement, interaction, or purchasing.

2. The method according to claim 1, wherein the method further comprises a step of training a plurality of first machines for localizing the face.

3. The method according to claim 1, wherein the method further comprises a step of training a plurality of second machines for localizing facial features in the face.

4. The method according to claim 1, wherein the method further comprises a step of extracting emotion-sensitive features from the face by applying emotion-sensitive feature filters to localized facial features and transient features.

5. The method according to claim 4, wherein the method further comprises a step of deriving emotion-sensitive feature filters, by first generating emotion-sensitive candidate filters and determining the emotion-sensitive feature filters by choosing the filters from the emotion-sensitive candidate filters that yield high responses to a sufficient number of facial images.

6. The method according to claim 5, wherein the method further comprises a step of generating the emotion-sensitive candidate filters by constructing a set of filters where each filter is designed to collect gradient response of a specific facial feature or a transient feature.

7. The method according to claim 1, wherein the method further comprises a step of determining facial muscle actions of the face based on the emotion-sensitive features.

8. The method according to claim 7, wherein the method further comprises a step of training a third machine so that the machine accepts the emotion-sensitive features as an input and computes a vector output where each component of the vector is the likelihood of the emotion-sensitive features arising from a specific facial muscle action.

9. The method according to claim 1, wherein the method further comprises a step of determining an affective state of the face by using a mapping from facial muscle actions to six emotional categories.

10. The method according to claim 1, wherein the method further comprises a step of determining an affective state of the face by using coordinates of six emotional categories in an affect space.

11. The method according to claim 1, wherein the method further comprises a step of determining the gaze direction of the person based on the three-dimensional facial pose and the positions of facial features.

12. The method according to claim 1, wherein the method further comprises a step of determining the body orientation of the person using a set of fourth learning machines wherein each machine is trained from images in a specific position in the view of the second means for capturing images.

13. The method according to claim 1, wherein the method further comprises a step of determining gross-level interest of the person based on the trajectory from tracking the person and the body orientation of the person.

14. The method according to claim 13, wherein the method further comprises a step of determining the gross-level interest of the person using a Bayesian graphical model wherein the orientations of the gross-level interest are modeled as hidden states.

15. The method according to claim 1, wherein the method further comprises a step of detecting the person's engagement with the retail element based on a trajectory from tracking the person and the body orientation of the person.

16. The method according to claim 1, wherein the method further comprises a step of identifying the person's interaction with the retail element based on a foreground object analysis between the person and a shelf.

17. The method according to claim 1, wherein the method further comprises a step of identifying the retail element with which the person is interacting based on a foreground object analysis and change detection on a shelf.

18. The method according to claim 1, wherein the method further comprises a step of detecting an incident of purchase and identifying the retail element that is purchased based on a foreground image analysis performed on a shelf and on a shopping cart or basket.

19. The method according to claim 1, wherein the method further comprises a step of segmenting the changes in affective states and interest based on the shopping behavior of the person,
wherein a sequence of the shopping behavior is divided into multiple segments, where each segment is a period in which the person shows a specific shopping behavior.

20. The method according to claim 1, wherein the method further comprises a step of determining the end response of the person toward the retail element using a Bayesian graphical model based on the changes in affective states and interest,
wherein the end response includes likelihood of purchase, a rating for a purchased product, and degree of satisfaction.

21. The method according to claim 20, wherein the method further comprises a step of decoding the intermediate responses of the person toward the retail element as the progression of hidden states in the Bayesian graphical model,
wherein the intermediate responses are defined as progression of the person's attitude changes toward the retail element.

22. An apparatus for determining a person's response to a retail element, based on the person's facial expression and shopping behavior, comprising:
a) at least a first means for capturing images that captures first input images,
b) at least a control and processing system that performs the following steps of:
detecting and tracking a face from the first input images, estimating two-dimensional and three-dimensional pose of the face, localizing facial features,
estimating gaze direction of the person using the two-dimensional and three-dimensional poses and the positions of the facial features and changes in affective state of the person by extracting emotion-sensitive features,
c) at least a second means for capturing images that captures second input images,
d) the control and processing system that performs the following steps of:
detecting and tracking the person from the second input images producing a trajectory of the person, and estimating body orientation,
identifying the shopping behaviors of the person toward the retail element, utilizing position and the body orientation of the person relative to the retail element, and
determining intermediate responses and end response of the person to the retail element by analyzing the changes in affective states and interest, in the context of the shopping behavior, and
e) at least a means for video interface that connects the first means for capturing images and the second means for capturing images to the control and processing system,
wherein the shopping behaviors include showing interest, engagement, interaction, or purchasing.

23. The apparatus according to claim 22, wherein the apparatus further comprises means for training a plurality of first machines for localizing the face.

24. The apparatus according to claim 22, wherein the apparatus further comprises means for training a plurality of second machines for localizing facial features in the face.

25. The apparatus according to claim 22, wherein the apparatus further comprises means for extracting emotion-sensitive features from the face by applying emotion-sensitive feature filters to localized facial features and transient features.

26. The apparatus according to claim 25, wherein the apparatus further comprises means for deriving emotion-sensitive feature filters, by first generating emotion-sensitive candidate filters and determining the emotion-sensitive feature filters by choosing the filters from the emotion-sensitive candidate filters that yield high responses to a sufficient number of facial images.

27. The apparatus according to claim 26, wherein the apparatus further comprises means for generating the emotion-sensitive candidate filters by constructing a set of filters where each filter is designed to collect gradient response of a specific facial feature or a transient feature.

28. The apparatus according to claim 22, wherein the apparatus further comprises means for determining facial muscle actions of the face based on the emotion-sensitive features.

29. The apparatus according to claim 28, wherein the apparatus further comprises means for training a third machine so that the machine accepts the emotion-sensitive features as an input and computes a vector output where each component of the vector is the likelihood of the emotion-sensitive features arising from a specific facial muscle action.

30. The apparatus according to claim 22, wherein the apparatus further comprises means for determining an affective state of the face by using a mapping from facial muscle actions to six emotional categories.

31. The apparatus according to claim 22, wherein the apparatus further comprises means for determining an affective state of the face by using coordinates of six emotional categories in an affect space.

32. The apparatus according to claim 22, wherein the apparatus further comprises means for determining the gaze direction of the person based on the three-dimensional facial pose and the positions of facial features.

33. The apparatus according to claim 22, wherein the apparatus further comprises means for determining the body orientation of the person using a set of fourth learning machines wherein each machine is trained from images in a specific position in the view of the second means for capturing images.

34. The apparatus according to claim 22, wherein the apparatus further comprises means for determining gross-level interest of the person based on the trajectory from tracking the person and the body orientation of the person.

35. The apparatus according to claim 34, wherein the apparatus further comprises means for determining the gross-level interest of the person using a Bayesian graphical model wherein the orientations of the gross-level interest are modeled as hidden states.

36. The apparatus according to claim 22, wherein the apparatus further comprises means for detecting the person's engagement with the retail element based on a trajectory from tracking the person and the body orientation of the person.

37. The apparatus according to claim 22, wherein the apparatus further comprises means for identifying the person's interaction with the retail element based on a foreground object analysis between the person and a shelf.

38. The apparatus according to claim 22, wherein the apparatus further comprises means for identifying the retail element with which the person is interacting based on a foreground object analysis and change detection on a shelf.

39. The apparatus according to claim 22, wherein the apparatus further comprises means for detecting an incident of purchase and identifying the retail element that is purchased based on a foreground image analysis performed on a shelf and on a shopping cart or basket.

40. The apparatus according to claim 22, wherein the apparatus further comprises means for segmenting the changes in affective states and interest based on the shopping behavior of the person, wherein a sequence of the shopping behavior is divided into multiple segments, where each segment is a period in which the person shows a specific shopping behavior.

41. The apparatus according to claim 22, wherein the apparatus further comprises means for determining the end response of the person toward the retail element using a Bayesian graphical model based on the changes in affective states and interest, wherein the end response includes likelihood of purchase, a rating for a purchased product, and degree of satisfaction.

42. The apparatus according to claim 41, wherein the apparatus further comprises means for decoding the intermediate responses of the person toward the retail element as the progression of hidden states in the Bayesian graphical model, wherein the intermediate responses are defined as progression of the person's attitude changes toward the retail element.

* * * * *